United States Patent [19]

Park et al.

[11] Patent Number: 5,672,816
[45] Date of Patent: Sep. 30, 1997

[54] LARGE STAGE SYSTEM FOR SCANNING PROBE MICROSCOPES AND OTHER INSTRUMENTS

[75] Inventors: Sang-il Park, Palo Alto; Ian R. Smith, Los Gatos; Michael D. Kirk, San Jose, all of Calif.

[73] Assignee: Park Scientific Instruments, Sunnyvale, Calif.

[21] Appl. No.: 448,004

[22] Filed: May 23, 1995

Related U.S. Application Data

[63] Continuation of Ser. No. 325,132, Oct. 20, 1994, abandoned, which is a continuation of Ser. No. 897,657, Jun. 12, 1992, abandoned, which is a continuation-in-part of Ser. No. 850,677, Mar. 13, 1992, Pat. No. 5,448,399.

[51] Int. Cl.$^6$ ............... G02B 21/06; G01B 9/04; G01N 21/84; G01N 21/01
[52] U.S. Cl. .............. 73/105; 250/306; 359/391
[58] Field of Search .............. 73/105, 864.91, 73/863, 866.5; 250/442.11, 306, 307, 440.11, 491.1; 359/391, 392, 393; 356/244; 269/21, 20; 248/678, 363

[56] References Cited

U.S. PATENT DOCUMENTS

| | | | |
|---|---|---|---|
| 1,864,895 | 6/1932 | Egy | 359/373 X |
| 2,691,887 | 10/1954 | Rinker | 73/105 |
| 3,721,119 | 3/1973 | Strimel | 73/816 |
| 3,835,699 | 9/1974 | Strimel | 73/774 |
| 3,909,105 | 9/1975 | Neiswander et al. | 359/201 |
| 4,103,542 | 8/1978 | Wheeler et al. | 73/105 |
| 4,391,044 | 7/1983 | Wheeler | 33/1 M X |
| 4,417,770 | 11/1983 | Tucker | 384/15 X |
| 4,556,317 | 12/1985 | Sandland et al. | 356/237 |
| 4,723,086 | 2/1988 | Leibovich et al. | 310/328 |
| 4,742,299 | 5/1988 | Stone | 73/661 X |
| 4,778,143 | 10/1988 | Koshiba | 248/678 |
| 4,899,055 | 2/1990 | Adams | 250/372 |
| 4,935,634 | 6/1990 | Hansma et al. | 250/306 X |
| 4,993,696 | 2/1991 | Furukawa et al. | 269/73 |
| 4,999,494 | 3/1991 | Elings | 250/306 |
| 5,103,095 | 4/1992 | Elings et al. | 250/306 |
| 5,132,837 | 7/1992 | Kitajima | 359/374 |
| 5,157,251 | 10/1992 | Albrecht et al. | 250/307 X |
| 5,172,002 | 12/1992 | Marshall | 250/306 X |
| 5,193,383 | 3/1993 | Burnham et al. | 73/105 |
| 5,291,775 | 3/1994 | Gamble et al. | 73/105 |
| 5,319,960 | 6/1994 | Gamble et al. | 73/105 |
| 5,345,815 | 9/1994 | Albrecht et al. | 73/105 |
| 5,376,790 | 12/1994 | Linker et al. | 250/306 |
| 5,448,399 | 9/1995 | Park et al. | 359/372 |
| 5,463,897 | 11/1995 | Prater et al. | 73/105 |

FOREIGN PATENT DOCUMENTS

| 161807 | 6/1992 | Japan . |
|---|---|---|

OTHER PUBLICATIONS

Advertisement for PAS 5500, Electronic Business, Mar. 30, 1992, p. 101.

*Primary Examiner*—Thomas P. Noland
*Attorney, Agent, or Firm*—Wilson Sonsini Goodrich & Rosati

[57] ABSTRACT

A large scale horizontal translation stage for a microscope or other instrument particularly a scanning probe microscope is disclosed. The translation stage is provided with air bearings which allow it to float over a planar surface. The translation stage is kinematically mounted on a guiding member such that the horizontal position of the translation stage is defined by the guiding member but the translation stage is free to move in a direction perpendicular to the planar surface. To position a sample, the air bearings are actuated and the guiding member moves the translation stage to a desired position. An attractive force, preferably suction in the air bearings, is then applied to hold the translation stage firmly against the supporting surface while the sample is analyzed. The preferred embodiment includes two optical microscopes. The first optical microscope is directed substantially perpendicular to the plane of the sample and has a focal point which coincides with the surface of the sample when it is being positioned by the translation stage. The second optical microscope is directed obliquely and focused on the probe.

23 Claims, 18 Drawing Sheets

LARGE STAGE SYSTEM FOR SCANNING PROBE MICROSCOPES AND OTHER INSTRUMENTS

This application is a continuation of application Ser. No. 08/325,132, filed Oct. 20, 1994, and now abandoned, which is a continuation of application Ser. No. 07/897,657, filed Jun. 12, 1992, and now abandoned, which is a continuation-in-part of application Ser. No. 07/850,677, filed Mar. 13, 1992, and now U.S. Pat. No. 5,448,399.

FIELD OF THE INVENTION

The present invention pertains to systems and methods for microscopically examining the surface of objects. More specifically, it pertains to the examination of large objects such as intact semiconductor wafers and lithographic photomasks, using scanning probe microscopes such as scanning tunneling microscopes and atomic force microscopes.

BACKGROUND OF THE INVENTION

1. Definitions

"Scanning probe microscope" (SPM) means an instrument which provides a microscopic analysis of the topographical features or other characteristics of a surface by causing a probe to scan the surface. It refers to a class of instruments which employ a technique of mapping the spatial distribution of a surface property, by localizing the influence of the property to a small probe. The probe moves relative to the sample and measures the change in the property or follows constant contours of the property. Depending on the type of SPM, the probe either contacts or rides slightly (up to a few hundred Angstroms) above the surface to be analyzed. Scanning probe microscopes include devices such as scanning force microscopes (SFMs), scanning tunneling microscopes (STMs), scanning acoustic microscopes, scanning capacitance microscopes, magnetic force microscopes, scanning thermal microscopes, scanning optical microscopes, and scanning ion-conductive microscopes.

"Probe" means the element of an SPM which rides on or over the surface of the sample and acts as the sensing point for surface interactions and may include the cantilever and tip, a chip from which the cantilever projects, and a plate on which the chip is mounted. In an SFM the probe includes a flexible cantilever and a microscopic tip which projects from an end of the cantilever. In an STM the probe includes a sharp metallic tip which is capable of sustaining a tunneling current with the surface of the sample. This current can be measured and maintained by means of sensitive actuators and amplifying electronics. In a combined SFM/STM the probe includes a cantilever and tip which are conductive, and the cantilever deflection and the tunneling current are measured simultaneously.

"Cantilever" means the portion of the probe of an SFM which deflects slightly in response to forces acting on the tip, allowing a deflection sensor to generate an error signal as the probe scans the surface of the sample.

"Tip" in an SFM means the microscopic projection from one end of the cantilever which rides on or slightly above the surface of the sample. In an STM, "tip" refers to the metallic tip.

"Scanning Force Microscope" SFM (sometimes referred to as Atomic Force Microscope) means an SPM which senses the topography of a surface by detecting the deflection of a cantilever as the sample is scanned. An SFM may operate in a contacting mode, in which the tip of the probe is in contact with the sample surface, or a non-contacting mode, in which the tip is maintained at a spacing of about 50 Å or greater above the sample surface. The cantilever deflects in response to electrostatic, magnetic, van der Waals or other forces between the tip and surface. In these cases, the deflection of the cantilever from which the tip projects is measured.

"Scanning Tunneling Microscope" (STM) means an SPM in which a tunneling current flows between the probe and the sample surface, from which it is separated by approximately 1–10 Å. The magnitude of the tunneling current is highly sensitive to changes in the spacing between the probe and sample. STMs are normally operated in a constant current mode, wherein changes in the tunneling current are detected as an error signal. A feedback loop uses this signal to send a correction signal to a transducer element to adjust the spacing between the probe and sample and thereby maintain a constant tunneling current. An STM may also be operated in a constant height mode, wherein the probe is maintained at a constant height so that the probe-sample gap is not controlled, and variations in the tunneling current are detected.

"Kinematic mounting" means a technique of removably mounting a rigid object relative to another rigid object so as to yield a very accurate, reproducible positioning of the objects with respect to each other. The position of the first object is defined by six points of contact on the second. These six points must not over or under constrain the position of the first object. In one common form of kinematic mounting, three balls on the first object contact a conical depression, a slot (or groove) and a flat contact zone, respectively, on the second object. Alternatively, the three balls fit snugly within three slots formed at 120° angles to one another on the second object. The foregoing are only examples; numerous other kinematic mounting arrangements are possible. According to the principles of kinematic mounting, which are well known in the mechanical arts, six points of contact between the two objects are required to establish a kinematic mounting arrangement. For example, in the first illustration given above, the first ball makes contact at three points on the conical surface (because of inherent surface imperfections, a continuous contact around the cone will not occur), two points in the slot, and one point on the flat surface, giving it a total of six contact points. In the second illustration, each ball contacts points on either side of the slot into which it fits.

2. The Prior Art

The introduction of scanning probe microscopes, including the scanning tunneling microscope and atomic force microscope, has provided a substantially improved capability for inspection of surface and near surface structures. Such microscopes can, in certain circumstances, resolve individual atoms on a surface and can map topographic variations on the sample with 0.1 nm vertical sensitivity or better. These microscopes have found widespread application in academic and industrial research laboratories. The majority of systems constructed have been used for the examination of samples smaller than 25 mm in any one dimension. Samples of this size may conveniently be prepared and handled, and are commonly used in other types of optical and electron microscopes. In the semiconductor industry, for example, it is routine practice to fracture a wafer in order to microscopically examine a small fragment of it. The process is destructive and so the material examined is wasted. Furthermore it is not possible to continue processing the wafer in order to directly correlate the state of the surface at the time of inspection with the properties or the performance of the part after subsequent processing stages; thus valuable information is inaccessible. However, as the significance and value of the images and data from scanning probe microscopes have become better appreciated, a need has arisen for tools which can inspect intact samples at various stages of a production process. In the semiconductor industry it is desirable to inspect semiconductor wafers which may be 200 mm in diameter or more, and photomasks and other materials which may be 250 mm square and as much at 7 mm in thickness. In other industries, and in scientific research, there are also many applications where the inspection of such large objects is desirable, especially if the inspection process is non-destructive.

Large sample inspection systems have been constructed embodying many microscope types, including optical microscopes and scanning electron microscopes and scanning probe microscopes. Typically such prior art systems include dual motorized translation stages which provide linear or rotational relative motion between the sample and the microscope in a plane parallel to the sample surface and approximately orthogonal to the direction of imaging. Where rectilinear motion is desired, two linear motion stages are commonly stacked in orthogonal directions to provide the desired motion. Either the sample or the microscope is attached to the stages and a support structure couples the three elements mechanically. An example of such an arrangement for optical microscopy is given in Lindow et al., U.S. Pat. No. 4,748,335. Although in some systems one stage may be attached to the microscope and the other to the sample, it is important to note that the mechanical linkage path between the microscope and the sample is comprised of two separate bearing assemblies in the two translation stages assembled in series; vibrational or thermal instabilities or non-planarities or non-linearities of motion are additive for the two stages and produce a composite positioning error which can substantially degrade the performance or positioning accuracy of the microscope. It is the stability of this mechanical support path which determines the mechanical stability of the microscope and its ability to resolve fine structures as well as to image the same point on the object even when the instrument is subject to external physical sources of interference such as vibrations, temperature fluctuations, and the like. Thus, in the design of high resolution instruments such as the scanning probe microscope, a key goal is to minimize the number of bearing stages between the sample and the microscope and to maximize the mechanical stability and strength of the complete support path whilst providing a means of precisely and accurately positioning the sample relative to the microscope.

Furthermore, in the early research versions of the scanning probe microscope, speed and ease of imaging were not major factors in the design of instruments. For example, the speed at which the sample could be translated from inspection site to site was not a major factor since the inspection process was in any case manually controlled by an operator. As systems for fully automated inspection have been developed, the translational speed and accuracy of the sample positioning system have become of greater importance, and it is a goal in the design of large sample systems to provide a high-speed, accurate method of positioning the microscope with respect to the sample.

Along with the drive for imaging speed and efficiency, the use of an auxiliary optical microscope has become important. Such microscopes are employed to locate the desired imaging location visually in the first place, so that the probe microscope tip can be correctly positioned over the sample. Such a system is disclosed in application Ser. No. 07/850,677, filed Mar. 13, 1992, now U.S. Pat. No. 5,448,399. Video optical microscopes can scan images much faster than typical probe microscopes of the present generation, and so overall throughput is increased by this combination of techniques. Furthermore the video image may be digitized so that the site selection process can be fully automatic using pattern recognition and other image analysis techniques.

Application Ser. No. 07/850,669, filed Mar. 13, 1992, and now U.S. Pat. No. 5,376,790, describes a probe microscope system in which biaxial translation is accomplished using a kinematic stage mount in which two adjustable kinematic translation elements combine to select the position of the probe microscope with respect to the sample. This provides a very efficient and compact translation mechanism for small samples. In that system the sample is mounted on the scanner, however, which is less practical with large samples since, as the mass of the sample increases, the resonant frequency of the scanner becomes lower and the system is more susceptible to external sources of vibration and interference. U.S. Pat. No. 5,448,399 also teaches how an auxiliary optical microscope may be incorporated in a scanning probe microscope.

U.S. Pat. No. 4,999,494 to Elings describes a scanning tunneling microscope system in which the microscope head is supported by feet which bear on the surface of the sample or on another surface which supports the sample. The probe microscope is attached to motorized stage means which position the microscope head in a plane roughly parallel to the sample surface. The head is unconstrained in the vertical direction and can thus accommodate variations in the flatness of the support surface whilst remaining in contact with the surface. A limitation of this approach is that the translation speed of the stage and the ability of the stage to make the smallest incremental motions is limited by friction and stiction effects between the support feet and the translation surface, which effects are always present since the support feet are permanently in contact and supporting the weight of the probe microscope. A further limitation of the approach is that there may be wear to either the feet or to the sample or support surface as the sample is translated, since the surfaces are rubbing. For semiconductor applications, this is particularly undesirable since the particles thus generated can cause defects to appear on the circuits being inspected.

Other prior art large sample probe microscope systems have been described, and these are essentially similar to systems developed for optical and electron microscopy. That is to say they achieve relative motion of the sample and probe by mounting either the sample or probe on a stacked combination of two linear translation units. Such systems consequently suffer from the mechanical instabilities of the bearings and structure of such translation means, and are also limited in translation speed and accuracy by the friction of such translation means.

As described in U.S. Pat. No. 4,723,086 to Leibovich et al., it is known to use an air bearing to provide support for a translation stage in a stacked configuration. Although an air bearing performs satisfactorily while the stage is being moved, it does not provide adequate stability when a desired position is reached and it is desired, for example, to scan the surface of a sample. U.S. Pat. No. 4,778,143 to Koshiba describes the use of an elastic member to lock a floating movable stage onto a stationary base, but elastic structures do not come close to providing the stability and rigidity required during the sample scanning operation in a scanning probe microscope. A scanning probe microscope must be rigidly constrained so that it is not affected by mechanical or thermal variations. This high degree of rigidity is necessary to enable the probe to accurately sense features on the scale of individual atoms. The Koshiba arrangement is specifically designed to provide an elastic coupling between the movable stage and the base and to allow tilting of the movable stage. This is entirely unsuitable for an SPM.

Another desirable feature for the examination of large objects using scanning probe microscopes is the development of means for accurately scanning with the probe rather than the sample. In this way, the mechanical design is considerably simplified since the probe head, including a scanner, detector and probe are normally much lighter than a large sample; inertial effects due to scanning the more massive sample are therefore eliminated. U.S. Pat. No. 4,871,938 to Elings as well as many others have described systems for scanning the tip of a scanning tunneling microscope and U.S. Pat. No. 5,025,658 to Elings has also described a system for forming atomic force microscope images with a scanning tip, cantilever and optical detector. Optical detection as disclosed by Elings, however, requires precise alignment of the cantilever with the illuminating laser beam; furthermore, the optical arrangement is bulky and reduces scanning fidelity. Finally the optical interferometer arrangement requires that the cantilever be deformed in order to satisfy an optical interference condition for correct operation, and this means that the force exerted by the tip on the sample may not be precisely selected in order to optimize imaging conditions. An article by G. L. Miller et al. in Rev. Scientific Instruments 62(3), March 1991, and an article by D. A. Grigg in Ultramicroscopy, May 1992, describe an atomic force microscope in which capacitance displacement sensors are incorporated in order to detect tip deflections due to sample topography as well as to detect lateral deflections of the scanner. This has the distinct advantage that the detection system is purely electronic in nature, although the capacitance detector is bulky and complex; it may not be easily batch fabricated but requires external electronics in order to energize and process the detector signals.

U.S. application Ser. No. 638,163 filed Jan. 4, 1991, and abandoned Nov. 5, 1992, in favor of file wrapper continuation application U.S. application Ser. No. 07/954,695, and now U.S. Pat. No. 5,345,815, describes the use of a piezoresistive cantilever assembly which detects height fluctuations on the sample surface and converts them into electrical signals, which arrangement is used in a preferred embodiment according to this invention. The advantage of this scheme is the inherent simplicity and low mass of the detection system. A number of problems exist with the system described in application Ser. No. 638,163 which relate to the present disclosure:

1) One limitation is that the cantilever does not have a monolithic probe tip mounted on the cantilever for scanning the surface of the sample. The tip must be glued to the cantilever before use. Thus the process described does not achieve the economy of fabrication or simplicity of operation that is desired.

2) No means is provided for conveniently making electrical and mechanical contact with the micro-fabricated piezo-cantilever assembly.

SUMMARY OF THE INVENTION

According to the present invention a method and apparatus for inspecting large intact objects is provided, including inspection of samples such as 200 mm or more diameter semiconductor wafers and photomasks and the like. A specific object of the invention is to provide a translation stage coupled to a microscope and sample which links the two in a stable kinematic configuration whilst imaging is in progress, but which permits lateral translation of the microscope relative to the sample using a very low friction air bearing whilst the parts are in relative motion. In this way very high mechanical stability and immunity to external vibrations is achieved whilst the translation means is static, but whilst it is moving the reduced friction of the air bearing permits high speed motion, thereby reducing the effects of backlash and stiction which can limit positioning accuracy and precision with conventional stage systems.

It is a further object of this invention to provide a very precise planar motion of the sample relative to the probe microscope head using a planar reference surface and a sample stage which is positioned parallel to this surface with good precision; such motion permits the probe to be maintained close to the sample surface even whilst the stage is in motion and so reduces the time spent in relocating the sample surface with the probe microscope after a motion cycle.

It is a further object of the invention to provide an efficient method for optically viewing the sample surface, including a microscope for examining the probe and the sample separately, in an arrangement which minimizes the risk of collision between the probe and the sample and the optical microscope and the sample as the coarse motion stage is in motion. This is accomplished by optimizing the relative heights of the probe and the optical microscope components.

It is a further object of the invention to provide a bright-field oblique optical view of the probe and sample, by means of a reflector mounted near the probe. A bright-field oblique optical view receives a much greater amount of reflected light from the imaged object than a dark-field view, which receives mainly scattered light from the imaged object in the oblique optical view.

It is an object of the invention to provide a complete scanning probe microscope system for the examination and measurement of large objects, including a scanning force microscope system in which the probe itself rather than the sample is scanned, in a system which includes three position sensors which are used to correct the scanning motion of the tip.

It is a further object of the invention to provide a means of imaging the sample using a piezo-resistive, batch-fabricated cantilever and tip assembly and a mounting structure which facilitates insertion and changing of the cantilever and tip assembly.

In an embodiment according to this invention, a single translation stage moves laterally on air bearings over a smoothly polished, highly planar base. The translation stage is free to move in any horizontal direction. When a desired position is reached, the air bearings are de-energized and a source of vacuum may be connected to the air bearings, thereby holding the translation stage tightly against the base. Since the air bearings are formed of rigid materials, the translation stage is held firmly in place so that highly delicate operations, such as the scanning of a sample with a scanning probe microscope, can be performed. When it is desired to analyze a different region of the sample, pressurized air is supplied to the air bearings. The translation stage may then be moved easily and precisely to a new position, which may be far removed from the original position, without countering the effects of stiction and friction.

In a preferred embodiment, the scanner (e.g., a piezoelectric tube) is mounted in the head of a scanning probe microscope. Accordingly, the scanner is forced to move only the fixed, limited mass of the probe and detection system, rather than the variable mass of the sample. This arrangement is particularly suitable for examining large samples.

DESCRIPTION OF THE INVENTION

Many features pertinent to the microscopic inspection system and method of the present invention are specifically described in U.S. patent application Ser. Nos. 07/850,677, filed Mar. 13, 1992, 07/850,669, filed Mar. 13, 1992, and 07/851,560, filed Mar. 13, 1992, each of which is incorporated herein by reference in its entirety.

Figure 1A:
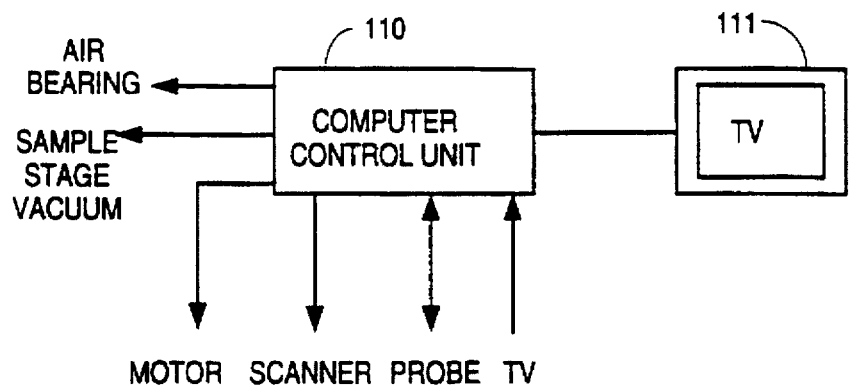
FIG. 1A illustrates a block diagram of the computer control unit of an embodiment according to this invention.
Figure 1B:
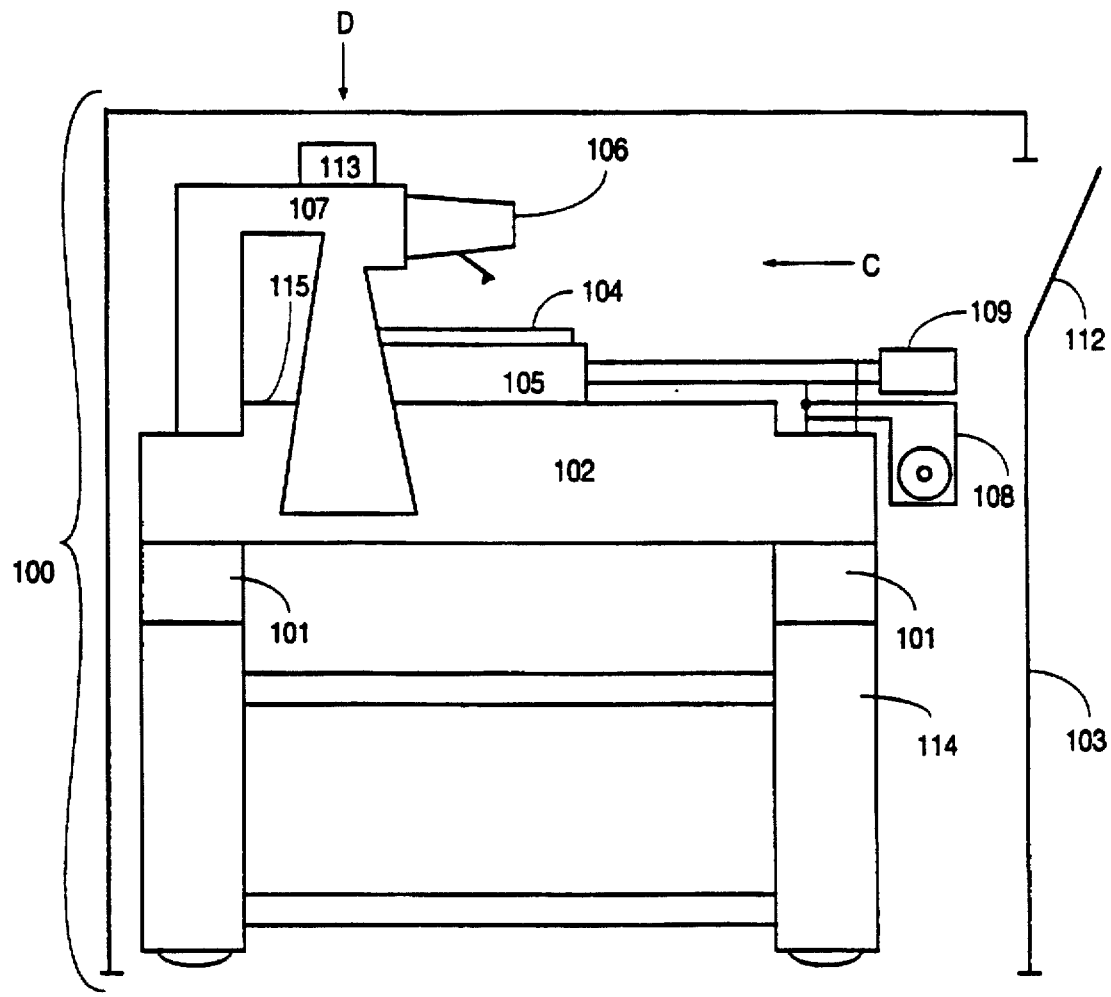
FIGS. 1B and 1C illustrate side and top views, respectively, of a microscope head unit in accordance with this invention.

FIGS. 1A and 1B illustrate the overall system schematically. A computer control unit 110 and a video display screen 111 are used to control the operation of a microscope head unit 100 and to record and analyze data and images therefrom. Computer control unit 110 includes interfacing circuitry for generating scanning and positioning signals to a probe microscope head 106, for controlling stage translation units 108 and 109, for controlling a sample stage 105 and a TV system 113, and for recording data from these various units. Images and data are displayed on video display screen 111, and a graphical user interface permits selection and control of the overall microscope operation. Details of the software control structure are specifically disclosed in U.S. application Ser. No. 07/851,560, now abandoned, and details the function of the controller are disclosed in U.S. Pat. No. 5,376,790.

Figure 1C:
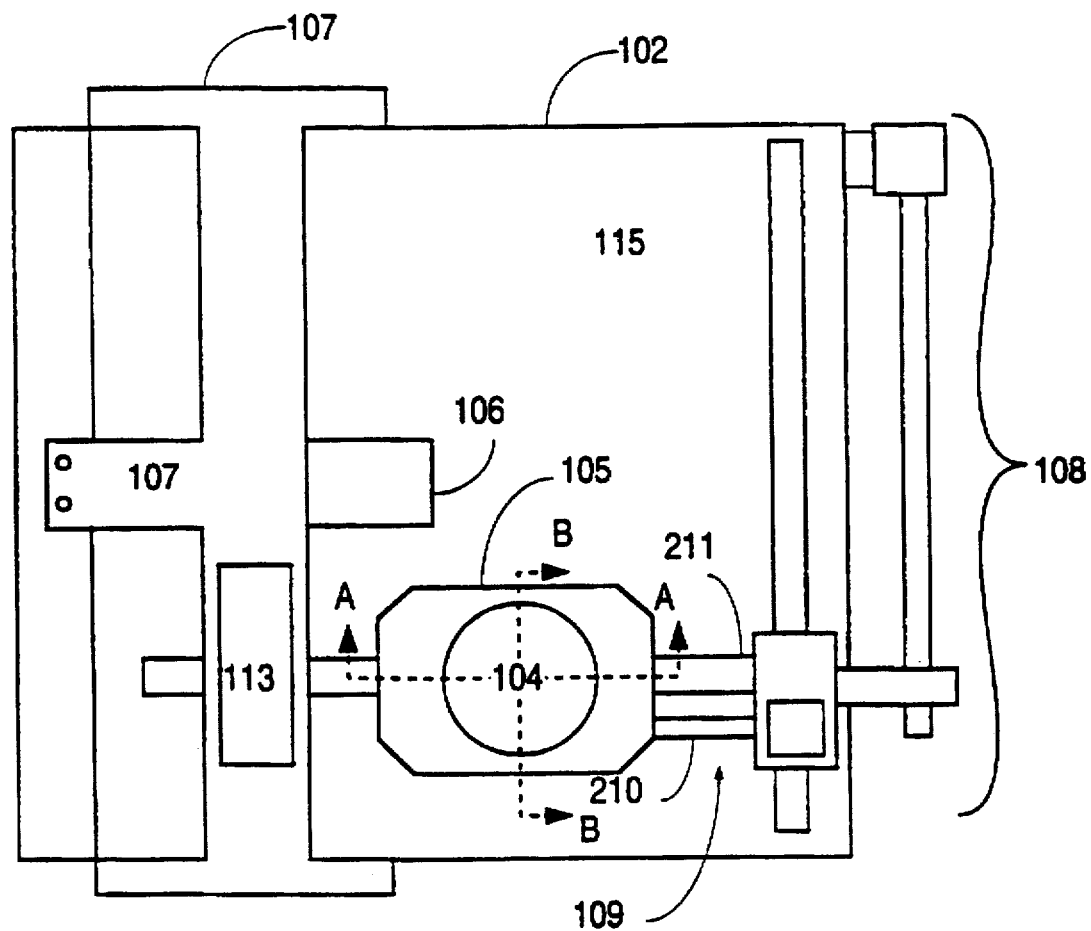

Microscope head unit 100 includes an external enclosure 103 which is designed to reflect or absorb external sources of vibrational or acoustic energy, as well as to maintain a uniform temperature within the enclosure. Typically, it may be fabricated from steel or polymer materials, and sound deadening materials may be laminated to its surfaces in order to optimize microscope performance. FIG. 1C shows a top view of microscope head unit 100 in which external enclosure 103 has been omitted for clarity. A sample 104 is introduced to the microscope head through an entry door 112 (FIG. 1B), either automatically by a robot or manually by an operator. Sample 104 is positioned on sample stage 105 and is captured thereon by holding means incorporated in stage 105, which holding means may be based upon mechanical fixtures, or by electrostatic magnetic or vacuum chucking, or by other means according to the type of sample and other considerations.

Sample stage 105 rests in static configuration on a surface 115 of a reference block 102 which has been ground to a precise contour. For the examination of planar objects, surface 115 is ground flat to high precision, such that translation of sample stage 105 over surface 115 provides minimal motion of sample 104 with respect to probe microscope head 106 and TV system 113 in a direction perpendicular to surface 115. Typically reference block 102 may be fabricated from granite, which has excellent mechanical strength and thermal inertia, whilst it provides high damping of any vibrational energy coupled into it. Reference block 102 may be 100 mm in thickness or more. Reference block 102 is mounted on servo-vibration isolating units 101 which are mounted on a floor standing support table, 114. Combined servo-vibration isolation units 101 and floor-standing support table 114 are available for example from the Technical Manufacturing Company, Peabody, Mass.

Sample stage 105 may be translated in two axes by motor translation units 108 and 109 which operate under command from computer control unit 110. During translation, sample stage 105 may be partially or fully supported by an integral air-bearing mechanism such that there is negligible friction between sample stage 105 and surface 115. Probe microscope head 106 and TV system 113 are rigidly mounted to a support structure 107, which is itself mounted rigidly on reference block 102.

Support structure 107 is designed to minimize the motion of the microscope head 106 and the TV system 113 with respect to reference support block 102. Typically, it may be constructed of materials which combine high strength with a low coefficient of thermal expansion as well as good acoustic damping characteristics. Materials such as granite or steel are suitable for this application. Support structure 107 is mounted to reference block 102 at three points around the perimeter of block 102 in order to ensure that the structure is optimally stable and has a high mechanical resonant frequency. For a system which attains very high stability, support structure 107 may be built from a steel I-beam girder of cross-sectional dimensions 100 mm×100 mm with a web thickness of 2 cm and may be coupled to reference block 102 along its length by an additional structure welded to it, as illustrated in FIGS. 1B and 1C. Design of support structure 107 follows conventional mechanical design principles.

Figure 2:
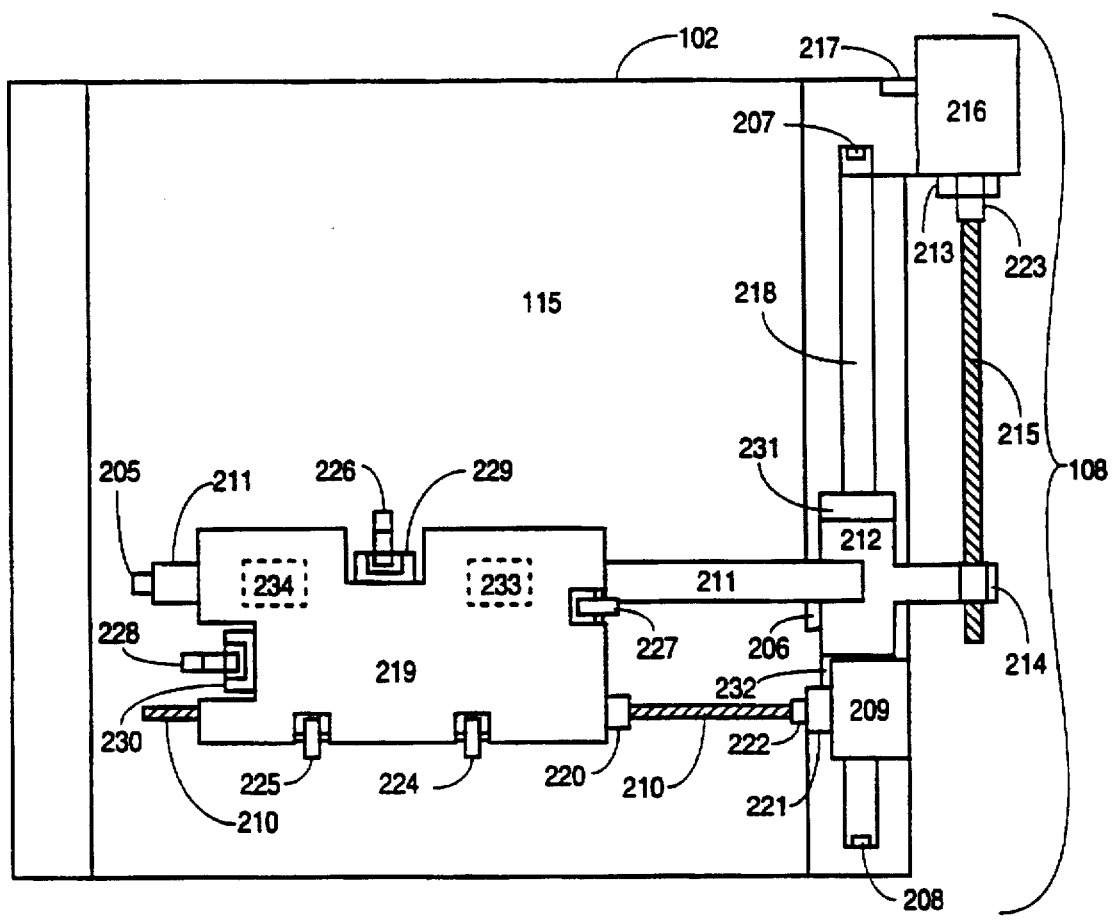
FIG. 2 illustrates a top view of the lateral translation units of the microscope.

FIG. 2 illustrates top view of reference block 102 and sample translation systems 108 and 109. Probe microscope 106, TV system 113, sample 104, sample stage 105 and support structure 107, which overlay this structure, have been omitted from FIG. 2 for clarity. Lateral motion of a sample stage guide 219 is guided by two linear track bearings, numbered 211 and 218, which are mounted orthogonal to one another. Bearings 211 and 218 are selected for offering good linearity of motion coupled with a high resistance to mechanical and thermal fluctuations. Bearings 211 and 218 also provide high resistance to forces which could cause rotation, pitch and yaw or other deviations relative to the desired motion axis. Such bearings utilize a recirculating ball mechanism. Bearing 218 is rigidly mounted to reference block 102. A slider 212 is attached to two recirculating ball heads 231 and 232 which are freely movable along the length of bearing 218 with low friction. Two heads are used for this purpose since they provide enhanced stiffness against rotation of slider 212 about an axis perpendicular to surface 115. The position of slider 212 along bearing 218 is controlled by a leadscrew 215 acting on a lead nut 214, which is in turn rigidly attached to slider 212. Leadscrew 215 passes through a clearance hole bored in slider 212. Rotation of leadscrew 215 is accomplished by a motor 216 driving through a coupler 213 and a thrust bearing 223, under instruction from computer control unit 110. Motor 216 is rigidly attached to a support member 217, which is in turn rigidly attached to reference block 102.

Bearing 211 is rigidly attached to slider 212 at one end, whilst the other end of bearing 211 is cantilevered above reference surface 115. Means for stiffening bearing 211 in the vertical axis may be provided in order to increase the resonance frequency of the bearing to vertical oscillations and so minimize vibrational sensitivity. Alternatively bearing 211 may be coupled to reference block 102 in a manner which constrains motion of bearing 211 in a direction perpendicular to reference surface 115 yet leaves bearing 211 free to move in a direction parallel to the surface of reference block 102. Such may be accomplished by the addition of an extra roller or track bearing assembly placed at the free end of bearing 211, running parallel to and equivalent to bearing 218, or by equivalent means.

Sample stage guide 219 is attached to two or more of recirculating ball sliders 233 and 234, which are freely slidable along the length of bearing 211. As with slider 212, sample stage guide 219 is positioned along the length of bearing 211 by a leadscrew 210 and a lead nut 220, which is rigidly attached to sample stage guide 219. A clearance hole for leadscrew 210 is bored through sample stage guide 219. Leadscrew 210 is driven by a motor 209 acting through a coupler 221 and a thrust bearing 222. Motor 209 is rigidly mounted to slider 212 and receives drive signals from computer control unit 110.

Motors 216 and 209 may be chosen for desirable torque and speed characteristics and may be DC or stepping motors. Stepping motors are preferred since they provide an economical means of precisely positioning the sample stage 105 without the use of additional position sensors which would be required if DC motors were used. Motor drive circuitry and software must be properly designed such that the motors can perform at high frequency, in order to give the high translation speeds made possible by the low friction air-bearings employed in this design, yet provide a sufficiently small minimum step size for precise translational motion of the Sample. In particular the drive amplifier impedances and the acceleration and deceleration software routines must be carefully optimized, as will be evident to those skilled in the art. Also viscous damping systems may be coupled to the motor spindle such that transient performance is improved. Micro-stepping drives may provide a reduced minimum step size whilst permitting higher speed translation. Typically motors 209 and 216 translate at two inches per second maximum speed, with a minimum step size of 6microns.

Limit switches 205, 206, 207 and 208 serve to signal to computer control unit 110 when slider 212 or stage guide 219 has reached the limits of its travel in either direction and may be of mechanical or optical types. Leadscrews 215 and 210 may be of ground steel with lead chosen to provide suitable speed of motion and step size of motion. Lead nuts 214 and 220 are of the anti-backlash type and may use either spring preloading or be of the recirculating ball type for increased accuracy of motion.

The position of sample stage guide 219 may thus be accurately controlled in two orthogonal directions by computer control unit 110. Sample stage 105 is placed over sample stage guide 219 and is mechanically coupled to it such that the horizontal position of sample stage guide 219 kinematically defines the position of sample stage 105 on reference surface 115, whilst permitting free motion of sample stage 105 in a direction perpendicular to reference surface 115. FIG. 2 illustrates five roller bearing assemblies 224, 225, 226, 227 and 228 whose centre elements are rigidly mounted, with outside elements freely rotatable, at five points around the edges of sample stage guide 219, with their rotational axes oriented horizontally. Bearings 224–228 are of a ball race roller type with planar or radiused outer bearing surfaces. Bearings 226 and 228 are rigidly coupled to sample stage guide 219 via adjustment hinge mechanisms 229 and 230 respectively. These mechanisms permit fine translational adjustment of the centre of rotation of the roller bearings in a direction parallel to surface 115 and orthogonal to the rotational axes of the respective roller bearings.

Figure 5:
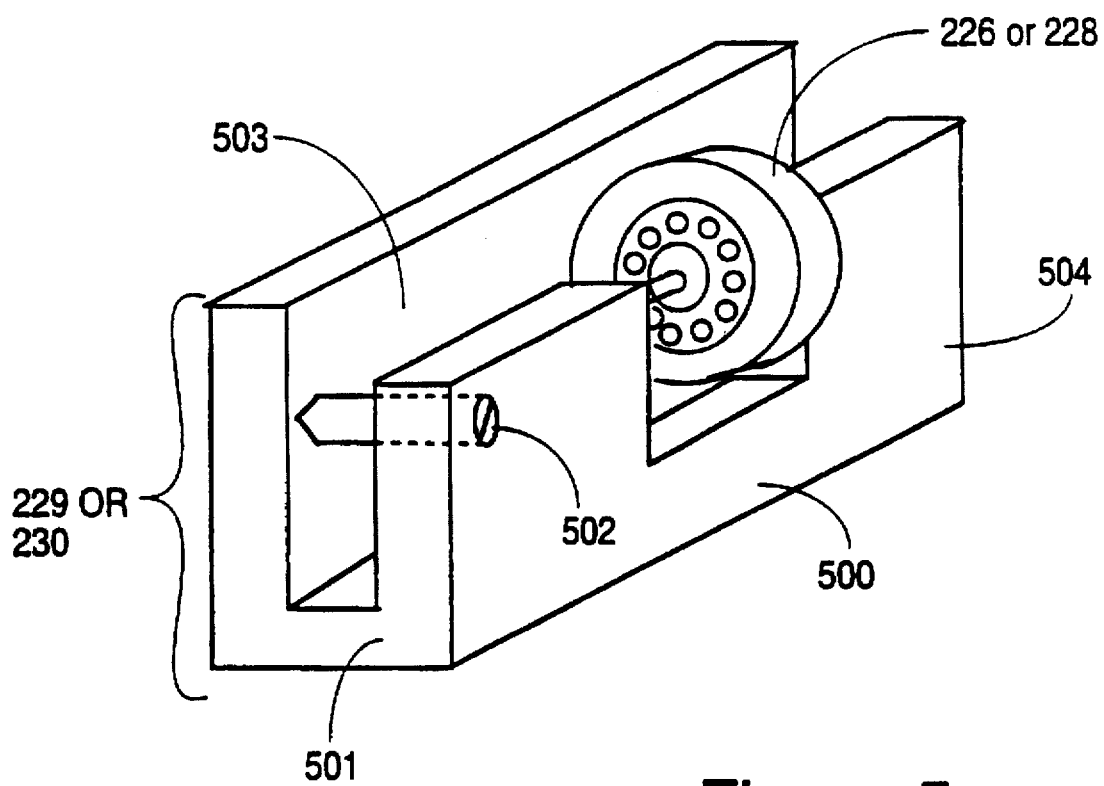
FIG. 5 illustrates the construction of the adjustment hinge mechanisms for the roller bearing assemblies.

FIG. 5 illustrates the design of adjustment hinge mechanisms 229 and 230, which are identical. Hinge block 500 is machined to be rigidly attached to sample stage guide 219 along rear surface 503. Roller bearing 226 or 228 is mounted onto hinge block 500 as shown and is free to rotate. Hinge block 501 is machined to a thin flexible hinge point along its length, point 501, such that the separation of bearing 226 from rear surface 503 can be adjusted by set screw 502 which is threaded into hinged portion 504 of hinged block 500. Other mechanisms for translation adjustment of roller bearings 226 and 228 with different force/displacement characteristics will be clear to those skilled in the art and may be substituted for adjustment hinge mechanisms 229 and 230 where more constant preloading forces are desired.

Figure 3:
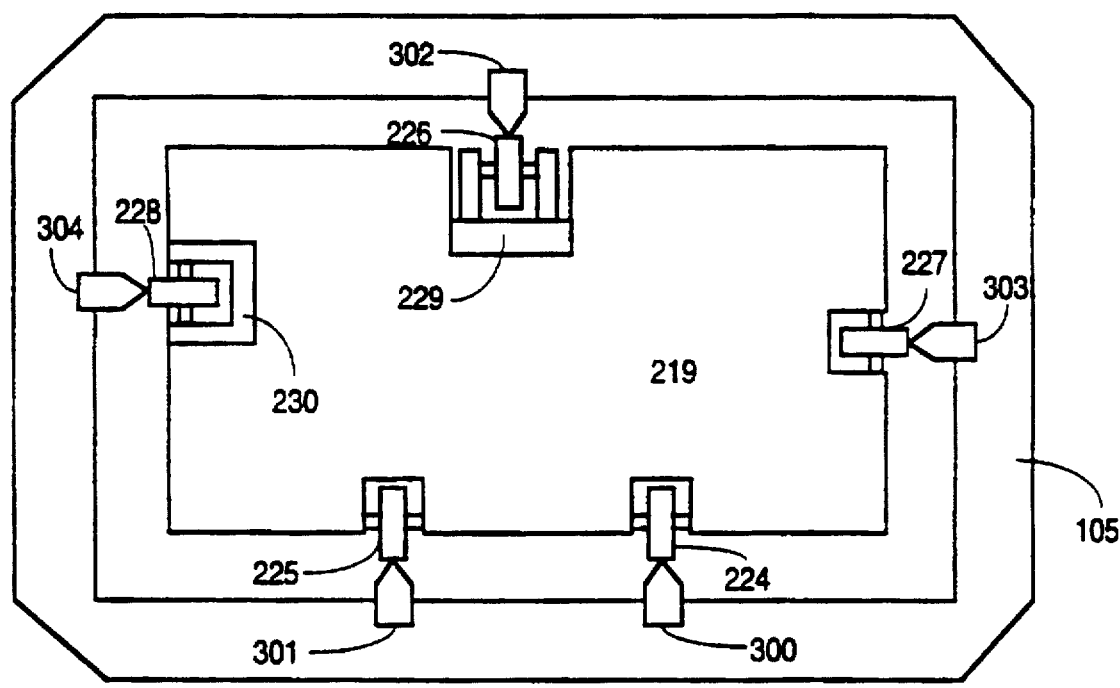
FIG. 3 illustrates a horizontal cross-sectional view of the translation stage and guide.

FIG. 3 is a cross-sectional view of sample stage 105 and stage guide 219 through a section parallel to surface 115 at the height of the axles of roller bearings 224–228 and shows the manner in which sample stage guide 219 engages sample stage 105. Bearings 224, 225, 226, 227 and 228 engage corresponding bearing surfaces 300, 301, 302, 303 and 304 respectively. These bearing surfaces should ideally be cylindrical, such that a cross section parallel to surface 115 is circular and so that there is a single point of contact between the bearings and their corresponding bearing surfaces. In some applications, it may be sufficient to provide flat bearing surfaces. Bearing surfaces 300–304 are embedded into an interior surface of sample stage 105 such that sample stage 105 can freely translate in the vertical direction. Bearings 224, 225 and 226 serve to constrain the motion of sample stage 105 in a horizontal direction orthogonal to bearing 211 as well as preventing rotation of sample stage 105 about an axis perpendicular to surface 115.

Bearing 226 may be adjusted in order to minimize play in this direction and establish appropriate loading on bearings 224, 225 and 226. Bearings 227 and 228 constrain the motion of sample stage in a direction parallel to bearing 211, and the location of bearing 228 may be adjusted by hinge mechanism 230 in order to establish minimal play and appropriate loading on bearings 227 and 228. Thus the location of sample stage 105 with respect to sample stage guide 219 is kinematically defined in a plane parallel to reference surface 115.

Further details of sample stage 105 are illustrated in FIG. 4, which is a perspective view of the general configuration of three air bearings 401, 402 and 403, which rest on surface 115 when the air supply is switched off, but which raise the stage a few microns above the surface when compressed air is supplied to the three jets through fittings 404, 405 and 406 respectively; pipes bored into stage 105 conduct compressed air to the three air bearings. The air supply to fittings 404, 405 and 406 is separately adjusted by air pressure regulators 407, 408 and 409, respectively, so that the stage floats evenly above surface 115, even if the mass loading of sample 104 and sample stage 105 is not evenly distributed on the three air bearings. The air supply to the regulators 407, 408 and 409 is switched by a solenoid-driven switch valve 410 which operates under command from computer control unit 110. A typical motion sequence involves first turning on the air bearings through valve 410 and waiting for the air bearings to rise. Then the motors 209 and 216 are used to translate the sample stage 105 to the required location. At that point, the air bearings are disengaged using valve 410. Servo-mechanisms for automatically regulating the height and tilt of stage 105, incorporating pressure or other types of proximity sensors and pressure controllers will be apparent to those ordinarily skilled in the art. It is a specific advantage of this design that perfect stability and strength of air bearings 401–403 is not required since, when stage 105 is in motion, air bearings 401–403 need simply provide low-friction support, whilst, when the stage is at rest, stability and rigidity are provided by the kinematic mechanical contact between the stage 105 and the support surface 115. In accordance with this invention, the stability of the sample stage 105, whilst it is at rest in contact with surface 115, is enhanced by connecting a vacuum pump 411 to each of air bearings 401–403 via a switch valve 410, thus creating an additional compressive force between sample stage 105 and reference surface block 102. Alternative means for creating an additional compressive force might include use of electro-magnetic or electrostatic forces which could be easily turned on and off according to whether the stage was in static or moving configuration, or a mechanical clamping means. Other means of providing this enhanced stability mount will be obvious to those skilled in the art.

Figure 6A:
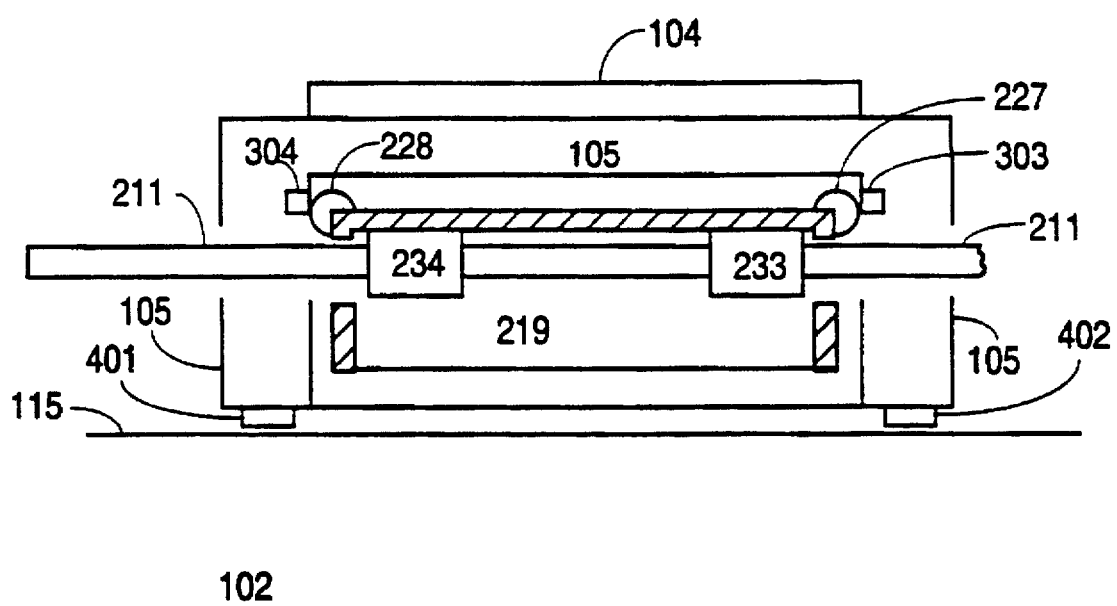
FIG. 6A illustrates a vertical cross-sectional view of the translation stage and guide taken through section A—A shown in FIG. 1C.
Figure 6B:
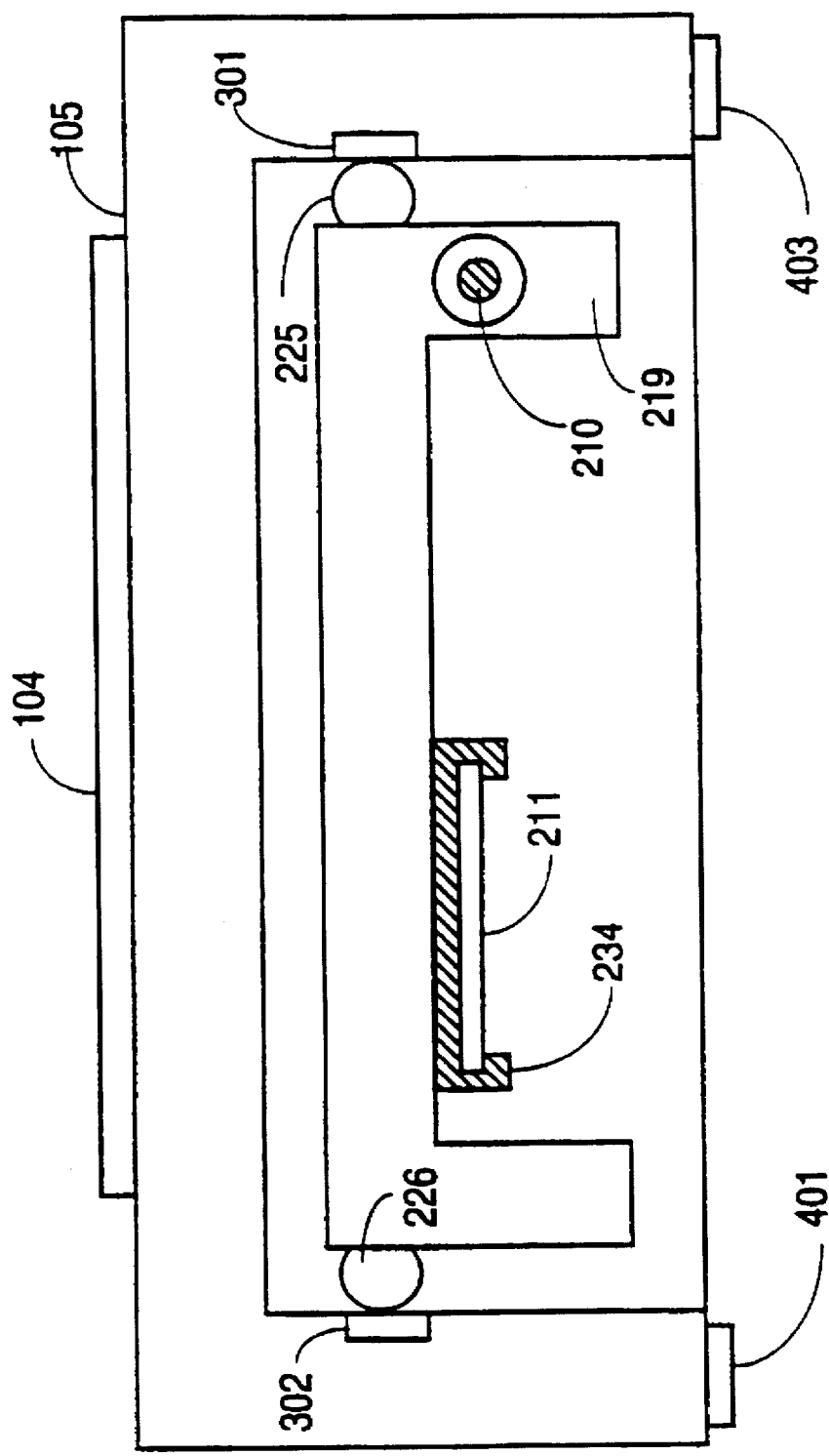
FIG. 6B illustrates a vertical cross-sectional view of the translation stage and guide taken through section B—B shown in FIG. 1C.

FIGS. 6A and 6B show a cross-sectional view through sample stage 105 and stage guide 219, illustrating the relationship of the various components which interact with sample stage 105, stage guide 219 and reference block 102. Air supply ducting which is bored into sample stage 105 in order to connect supply pipes is not shown for clarity. It is seen that the stage 105 is free to move in the vertical direction guided by bearings 227 and 228 as well as the bearings 224, 225 and 226.

Air bearings 401, 402 and 403 are machined separately to fit into sample stage 105 and are inset to their respective locations using a press. The top surface of sample stage 105 is ground and polished precisely parallel to the contact plane of air bearings 401, 402 and 403, such that when the stage is translated on surface 115 the height of the top surface of stage 105 is invariant. This is advantageous since the surface height of a parallel-sided sample 104 thus remains constant even as it is translated, and a probe can be maintained in close proximity to the surface of sample 104 so the time spent recontacting the surface can be shortened.

Figure 4A:
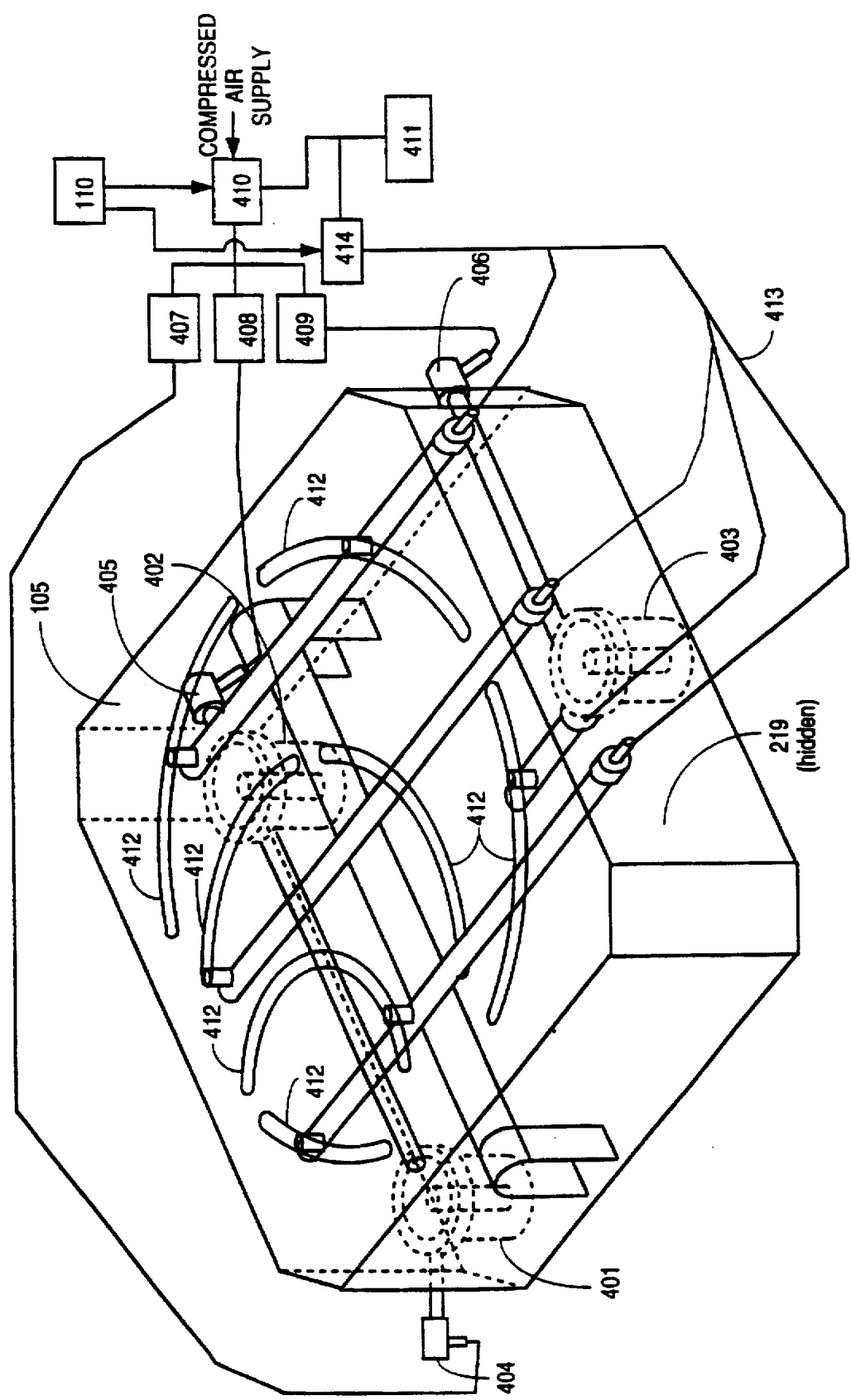
FIG. 4A illustrates a perspective view of the translation stage and components thereof and a schematic view of the pressurized air and vacuum supply units.
Figure 4B:
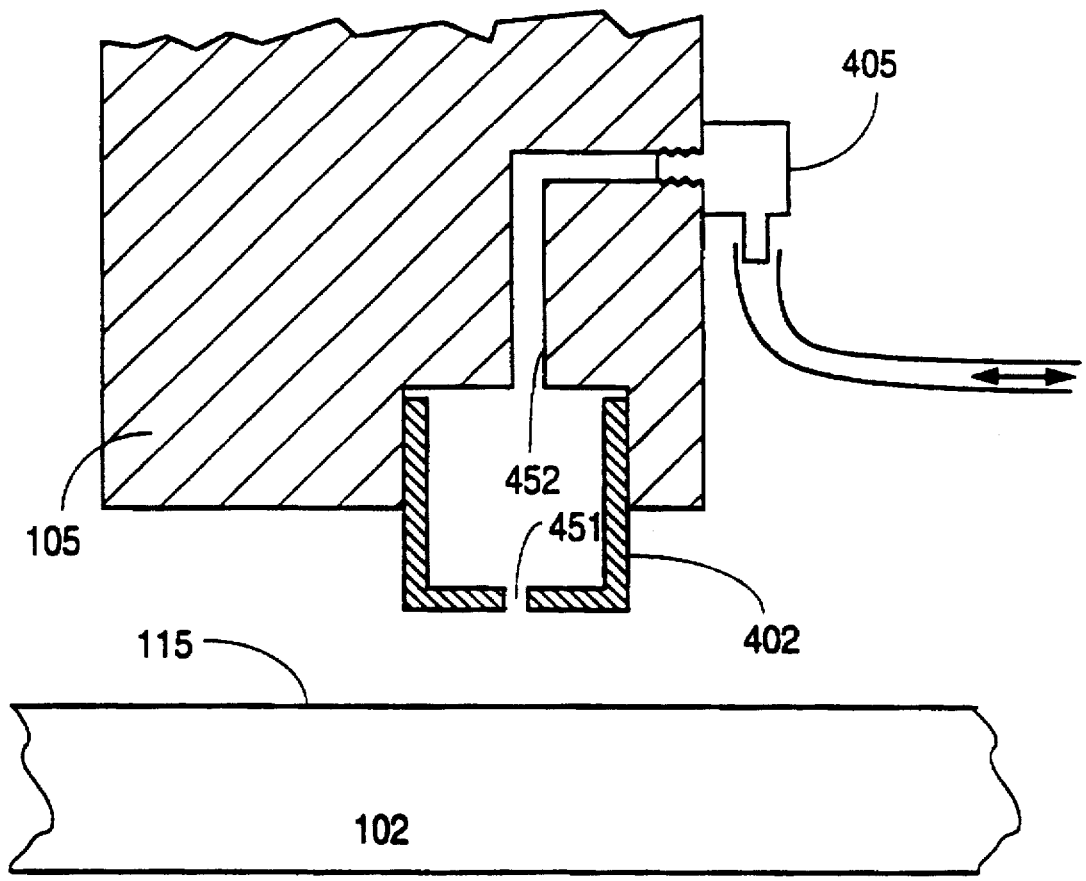
FIG. 4B illustrates a vertical cross-sectional view through the center of an air bearing.

A typical air bearing is illustrated in FIG. 4B as a cross section through air bearing 402 in a plane orthogonal to surface 115. An air bearing aperture 451 provides a reactive force to sample stage 105 in a direction away from surface 115 roughly equal to the surface area of the aperture multiplied by the air pressure supplied to it via a bored pipe 452 and pipe fitting 405. Different sized apertures for the air bearings can be employed to provide different degrees of floatation force according to the mass of sample 104 and sample stage 105. For example, if sample stage 105 is built from a dense material, such as stainless steel, it is advantageous to machine a large air bearing area in order to exert the necessary lifting force at modest air supply pressure; when the combined mass of sample 104 and stage 105 is small then a smaller air emission surface area may be acceptable. A diameter of 1 cm for aperture 451 may be suitable for a sample stage 105 made from stainless steel, whereas a diameter of only 5 mm may be suitable where the sample stage is constructed from aluminum; in both cases the stage floats with air inlet pressures of approximately 20–30 pounds per square inch. The design of air bearings follows conventional principles which are known to those skilled in the art. Air bearings 401, 402 and 403 may be machined from stainless steel or other materials, and may have a single or multiple orifices in order to distribute the load. Furthermore, air bearings 401, 402 and 403 may have a pointed or spherical lower surfaces which contact surface 115 when the air bearings are de-energized, such that there are only three points of contact between sample stage 105 and surface 115, one at each air bearing. In this way, the mechanical stability of sample stage 105 with respect to tilt is assured since the three contact points provide optimum stability and, combined with the kinematic interaction with stage guide 219, sample stage 105 is uniquely positioned with very high stability.

FIG. 4A also shows surface details of sample stage 105. Sample stage 105 includes a milled surface pattern 12 which is connected through internal ductwork and external piping 413 to a vacuum pump 411, such that when a sample 104 is placed on the stage 105, the vacuum thus created holds the sample to the stage with excellent stability. Vacuum vents of various shapes are provided such that semiconductor wafers and the like of different diameters can be so attached to sample stage 105. Vacuum valve 414 controls the vacuum supply and may be either manually controlled or may receive computer control signals from controller 110.

Figure 7A:
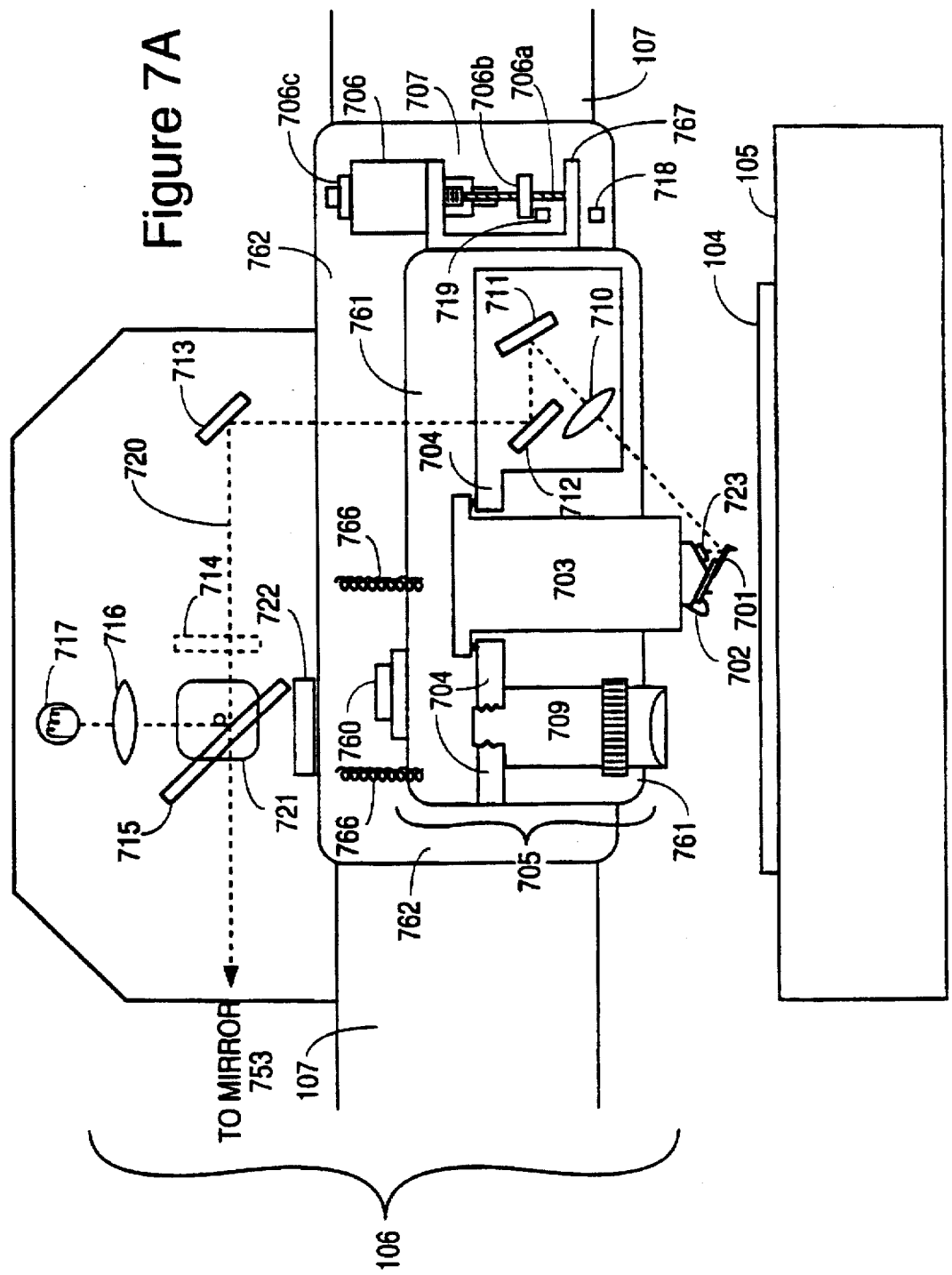
FIG. 7A illustrates a side view of the microscope head, showing the TV system, taken from direction C shown in FIG. 1B.

FIG. 7A shows the disposition of probe microscope head 106 on support structure 107 with respect to sample 104. The microscope head 106 includes a probe 701 and means for scanning the probe over the sample surface, comprising a scanner assembly 703. Probe 701 is kinematically, removably mounted on a probe mount 702, which in turn secured to scanner assembly 703. Microscope head 106 also includes two optical microscopes, described below, for providing an on-axis view of the sample surface and an oblique view of the probe and the sample. TV system 113 is also described below.

A portion of microscope head 106 is raised or lowered relative to both support structure 107 and sample translation stage 105 by means of a motor-driven, vertical translation stage 705. Vertical translation stage 705 comprises a plate 761 mounted on a vertical slide rail 760. Slide rail 760 is rigidly fixed to a vertical plate 762 which in turn is rigidly fixed to support structure 107. Stage 705 thus can be raised or lowered relative to support structure 107.

A bracket 704 is rigidly fixed to vertical stage 705. Scanner assembly 703 is kinematically, removably mounted onto this bracket. In addition, an objective lens 709, a lens 710, and mirrors 711 and 712 are attached to bracket 704.

The motion of vertical translation stage 705 is controlled by a stepping motor 706 and a micrometer 707, under control of computer control unit 110. The drive shaft of stepping motor 706 is axially connected via a flexible coupler to a pushing screw 706a which is threaded through a fixed nut 706b mounted on plate 762. Stepping motor 706 slides on a slide rail 706c also mounted on plate 762 as pushing screw 706a advances or retreats through fixed nut 706b.

Stage 705 is biased against the tip of the pushing screw by a pair of springs 766 as well as by a fixture 767 rigidly fixed to stage 705. Springs 766 are connected between stage 705 and plate 762. Fixture 767 rigidly connects the body of stepping motor 706 to stage 705. Fixture 767 also makes contact with the tip of pushing screw 706a, as shown in FIG. 7A. Springs 766 in combination with fixture 767 provide means to maintain contact between the tip of the pushing screw and stage 705 at all times. In addition, springs 766 provide means to reduce significantly backlash between pushing screw 706a and fixed nut 706b.

As pushing screw 706a advances or retreats through fixed nut 706b stage 705 is lowered or raised, respectively, relative to both support structure 107 and sample stage 105. Micrometer 707 has a resolution of 80 turns per inch of travel. Limit switches 718 and 719 are attached to plate 762 and signal to control unit 110 when stage 705 is at the limits of its travel. Stage 705 thus provides for motion of probe 701 along an axis perpendicular to sample 104. Stage 705 also provides for adjustment of the focus of objective lens 709, by lowering or raising the focal plane of lens 709 with respect to an imaged object.

In combination with TV system 113, the components shown in FIG. 7A also form a video microscope system which selectively permits viewing of sample 104 at high magnification from a perpendicular direction above the sample using lens 709, or viewing of probe 701 and sample 104 at lower magnification at an oblique angle through lens 710. This dual facility is very valuable in controlling the probe microscope since both the integrity of probe 701 and the location to be examined on sample 104 can conveniently be selected.

Figure 7B:
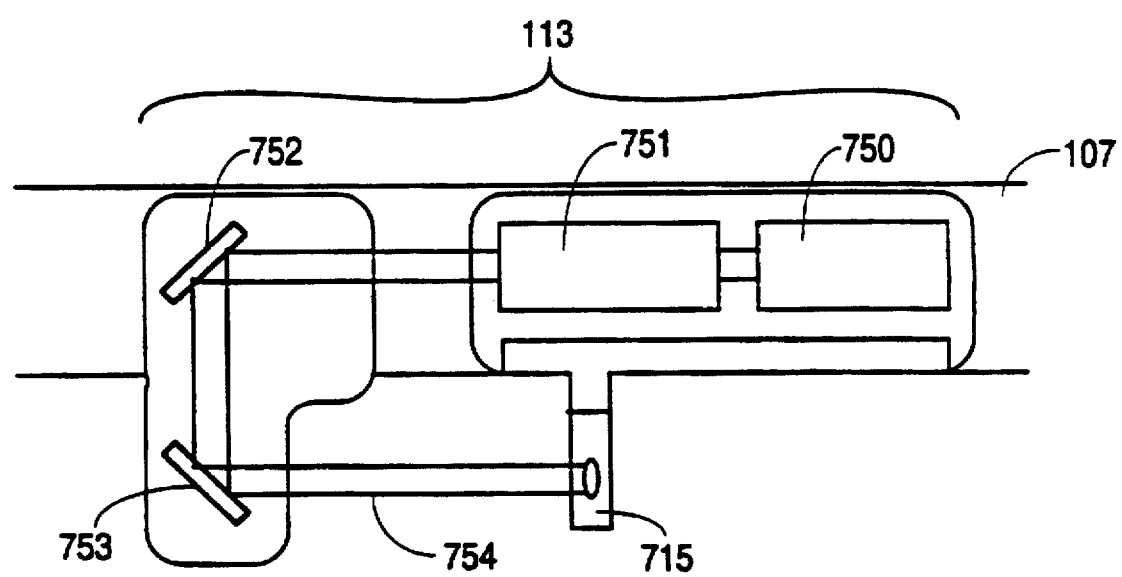
FIG. 7B illustrates a top view of the TV system, taken from direction D shown in FIG. 1B.

A top view of TV system 113 is illustrated in FIG. 7B. TV system 113 includes a color video camera 750, and a motorized zoom lens 751 as well as two mirrors 752 and 753 for directing light from an optical beam splitter 715 along a beam path 754. Motorized zoom lens 751 may be a 60 mm–300 mm focal length motorized zoom lens, or other zoom lens combined with a motor, such as has been disclosed in application Ser. No. 07/850,677. Video camera 750, zoom lens 751 and mirrors 752 and 753 are mounted on flat plates which are attached to support structure 107.

Referring again to FIG. 7A, high magnification microscope objective lens 709 is attached to bracket 704, and provides a view of the surface of sample 104 from a roughly perpendicular direction. An image of sample 104 is reflected by a beam splitter 715 towards TV system 113 such that an image of the sample may be viewed on monitor 111.

Low magnification lens 710 and mirrors 711 and 712 are attached to bracket 704 and thus can be raised or lowered via vertical translation stage 705. Lens 710 is focused obliquely onto probe 701 and may be a 50 mm focal length bi-convex lens. Thus the surface of sample 104 comes into focus when probe 701 is in the proximity of sample 104. A mirror 713 and optical beam splitter 715 are mounted on a vertical plate 770 attached to support structure 107. Mirrors 713,712 and 711 serve to direct light from beam splitter 715 to lens 710 along a beam path 720 and to direct the image back along the same path, through beam splitter 715 and thus to TV system 113, causing an image to be seen on monitor 111 (FIG. 1). It is a specific design objective that the probe 701 should remain in focus over the entire travel of stage 705 since this permits visualization of the integrity of probe 701 at all times. This is accomplished by arranging that the lens 710 operate at infinite conjugate i.e., the lens 710 forms an image of the probe at infinity, by placing the imaged object one focal length in front of the lens, and also by ensuring that beam path 720 between mirrors 712 (mounted on bracket 704) and 713 (rigidly fixed to support structure 107) is parallel to the direction of motion of stage 705. Other equivalent means for ensuring that the probe remains in focus will be obvious to those skilled in the art, including the provision of a second focusing mechanism to accomplish this task.

Illumination for the two viewing systems is provided from a single illuminating light bulb 717 via a condenser lens 716 and beam splitter 715. Beam splitter 715 splits the illuminating light into two beams of roughly equal intensity. The first beam illuminates sample 104 through lens 709, in an arrangement commonly known in microscopy as Kohler illumination, which provides uniform spatial illumination. An on-axis image of sample 104 is formed by lens 709 and directed towards TV system 113 by reflection from plate glass beam splitter 715. Thus the video image of sample 104 may be visualized on monitor 111. The second beam of illuminating light is reflected by beam splitter 715 towards mirror 713, and serves to illuminate the oblique view through lens 710 via mirrors 713, 712 and 711. A shutter 722 is mounted on the spindle of a motor 721 such that it may be rotated. Which view (on-axis or oblique) is visualized on monitor 111 is determined by the position of shutter 722, which selectively obscures one of the two images according to control signals from computer 110. Thus only one image is visualized at a time. FIG. 7A illustrates the shutter 722 in position to block the on-axis view (through lens 709) such that the oblique view is visualized; if shutter 722 is rotated to position 714 (dashed lines) then the oblique view (through lens 710) is obscured and the on-axis view is visualized. Intermediate positions for shutter 714, or other arrangements, would permit simultaneous viewing of parts of both images. Bulb 717, lens 716 and motor 721 are mounted on vertical plate 770 which is attached to support structure 107.

Figure 9:
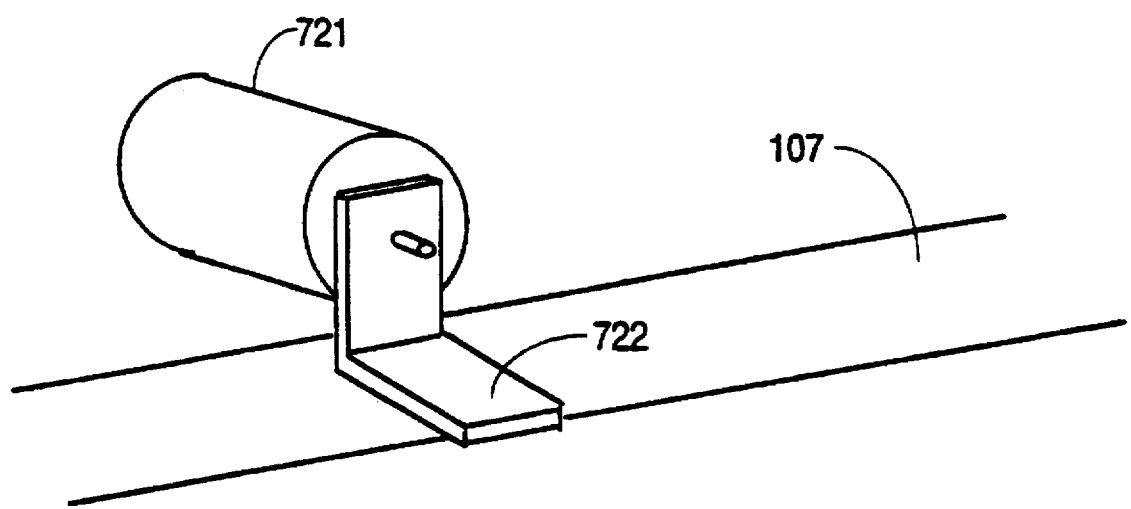
FIG. 9 illustrates a view of the shutter motor mechanism.

A detailed view of shutter 722 and motor 721 is shown in FIG. 9. Shutter 722 is a bracket which is preferably coated to be optically absorbent, either by painting or anodizing it black, or by the use of black velvet material, as is commonly known in the art. Shutter 722 may also be angled with respect to the light beam in order to reflect energy away from beam splitter 715. Motor 721 may be any type of stepping motor for positioning objects rotationally, or the like.

One potential limitation of the oblique viewing system formed by lens 710 is that the system normally operates in dark-field mode, which is to say that only a fraction of scattered light from sample 104 and probe 701 is visualized in the oblique image. For example, a perfectly reflecting sample would appear dark in the image, since the illumination from bulb 717 would be reflected from the surface away from lens 710 and be lost. To overcome the problem, a mirror 723 is attached to probe mount 702. Mirror 723 is positioned and angled such that it reflects the lost illumination reflected by the sample and probe back along a reverse path so that the sample and probe are now illuminated in bright field conditions and the oblique view optical image is substantially improved. Mirror 723 may be planar or may be curved for improved efficiency or to accommodate a wider range of probe and sample surface gradients. The angle, position, shape and size of mirror 723 are dictated by the angle of the oblique view, and by the slope of the sample surface and by other factors, as will be clear to those skilled in the art.

There are other alternative embodiments of this design of the oblique viewing system that provide for bright field viewing conditions. For example, the direction of light from bulb 717 incident on the probe (and the sample when the probe is in close proximity to the sample surface) can be altered, using lenses and mirrors, so that the probe is illuminated from the opposite side of scanner assembly 703. In this configuration, the direction of illumination is angled in such a way that specularly reflected light from the probe and sample follows the reciprocal path 720. A possible disadvantage of this configuration, however, is that scanner assembly 703 may at least partially block this path of direct illumination. Means for overcoming this obstruction, for instance by directing light through an opening in the side of scanner assembly 703 and past the probe mount 702, may be somewhat cumbersome.

Another alternative embodiment uses a light source positioned substantially beneath scanner assembly 703 so that sample and probe are illuminated from close range, for instance by an LED (light-emitting diode) or a fiber optic light source.

One aspect of the design of this probe microscope system concerns minimizing the risk of collisions when inspecting objects with undulating topography. When moving the sample stage 105 it is possible for some raised portion of the sample 104 to contact either probe 701 or objective lens 709 with the attendant risk of damage to those elements. With probe 701 close to the surface of the sample 104, lens 709 may be struck by some raised portion of sample 104 distant from the probe location whilst the stage is in motion. Equally, whilst lens 709 is focussed on the surface of sample 104, probe 701 may be struck by some raised portion of sample 104 when stage 105 is in motion. In order to minimize the risk of such collisions, it is advantageous to position probe 701 so that it is approximately at the midpoint of the working distance of objective lens 709, which is to say that when lens 709 is focused on a flat sample, probe 701 is separated from the sample 104 by half the distance that lens 709 is separated from the sample. In this case, a sample with a protrusion of height equal to the working distance divided by 2 can only just strike probe 701 when the stage is in motion. Equally, when probe 701 is close to the sample surface, the same size of sample protrusion (working distance divided by 2) can just strike lens 709. Thus the risk of damage to either probe or lens is minimized by this placement height. In applications where the sample is flat, the height separation between probe 701 and the focal plane of lens 709 may be reduced such that minimal time is spent in adjusting stage 705 when changing imaging mode from probe to optical viewing, and vice-versa.

The benefits of this arrangement may be illustrated by considering the normal operational sequence for this type of microscope system. First, the sample 104 must be loaded into the instrument. This is accomplished by first raising vertical translation stage 705 so that probe 701 is clear of any protrusions on sample stage 105, energizing the stage 105 air bearings and translating the stage to some convenient loading location under computer control. Having loaded the sample and secured it using the vacuum chuck or by other means, the stage may then be translated to place some portion of the sample beneath lens 709. Motor 706 is commanded to position vertical translation stage 705 such that lens 709 is focused onto the surface of the sample. At this time, probe 701 is clear of the sample surface since it is mounted above the focal plane of lens 709. In routine operation it is normal to first select a desired field of view to examine with the probe using the high magnification optical microscope. Sample 104 can be translated laterally over surface 115 to select the field of view. At any time the integrity of probe 701 can be viewed using oblique lens 710. When it is desired to scan a probe image of the region selected using the optical view from lens 709, the stage 105 can be commanded to translate a pre-programmed lateral displacement which causes the probe 701 to be above the selected region of sample 105. Air supply to air bearings 401–403 of stage 105 can then be disconnected by valve 410 and vacuum pump 411 can be connected to air bearings 401–403 so that stage 105 is drawn firmly to surface 115 of block 102. Probe 701 can then be lowered towards the sample surface for scanning, under computer control of vertical translation stage 705 through motor 706. During this sequence, probe 701 may be continuously examined using oblique viewing lens 710 since the image through this lens remains in focus on probe 701 as probe 701 approaches the sample. When probe 701 is in proximity of the sample an in-focus view of the sample 104 may also be visualized through lens 710. When probe imaging is complete the probe may be withdrawn, air bearings 401–403 re-energized, and the sample moved to some new location for imaging.

Figure 8A:
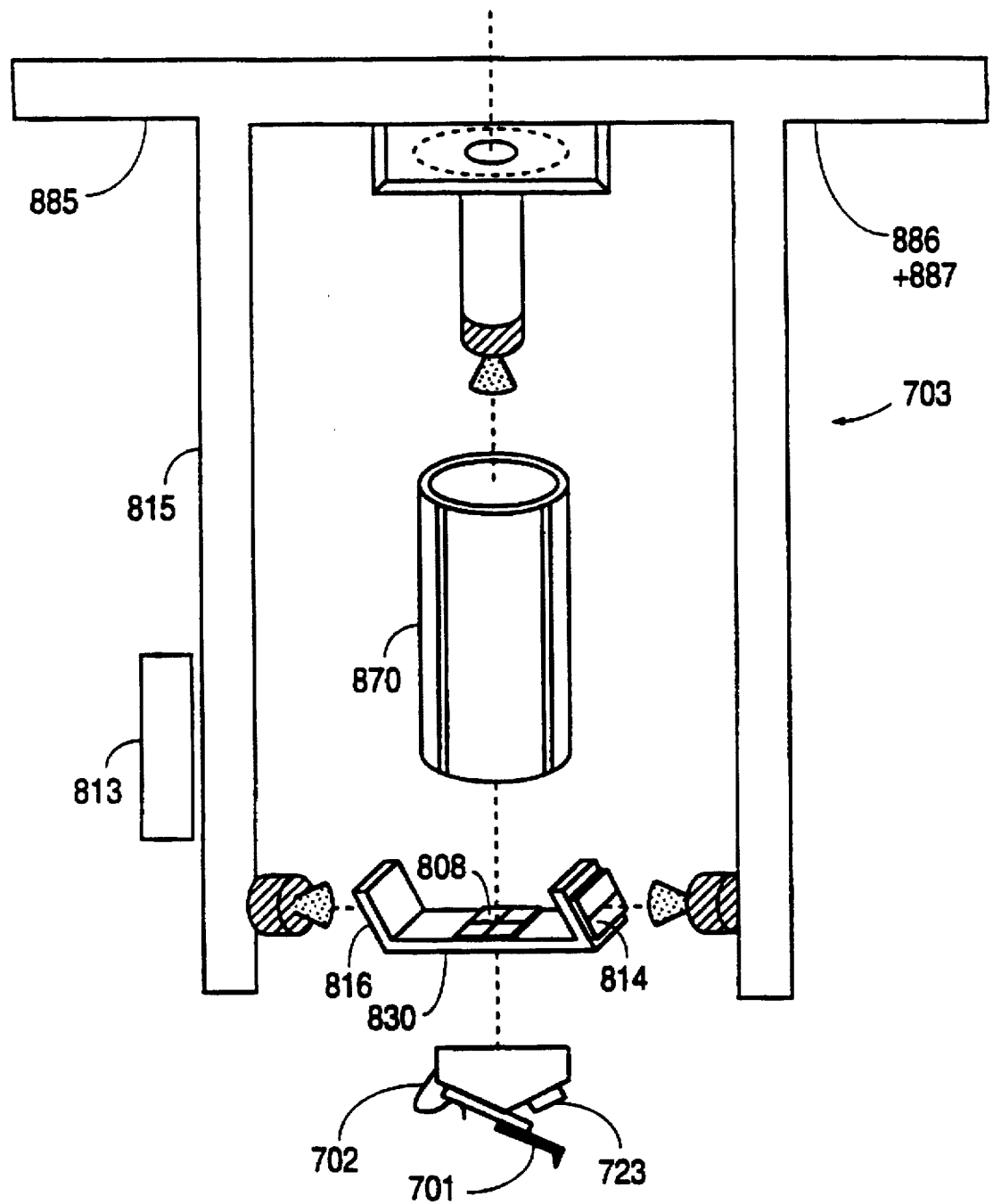
FIG. 8A illustrates a cross-sectional exploded view of the scanner.
Figure 8B:
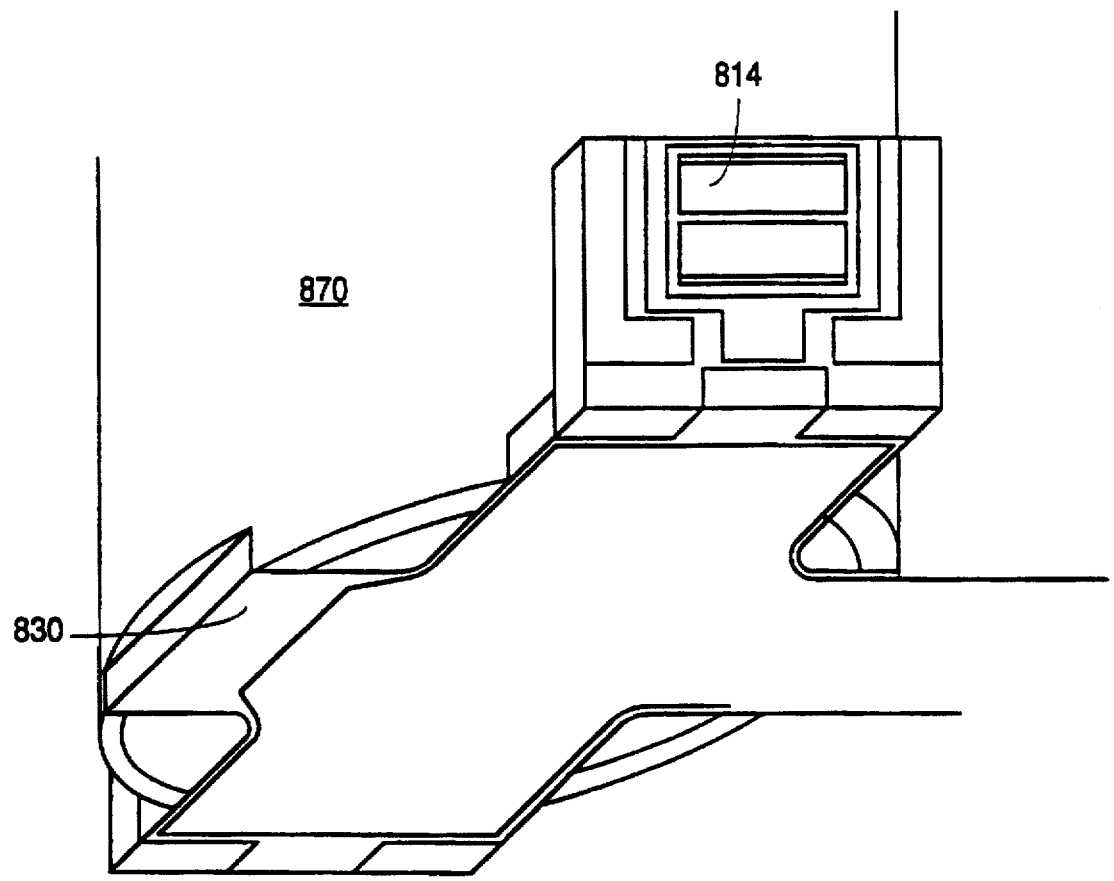
FIG. 8B illustrates the mounting of the fixture containing photodiodes on the piezoelectrical tube.
Figure 8C:
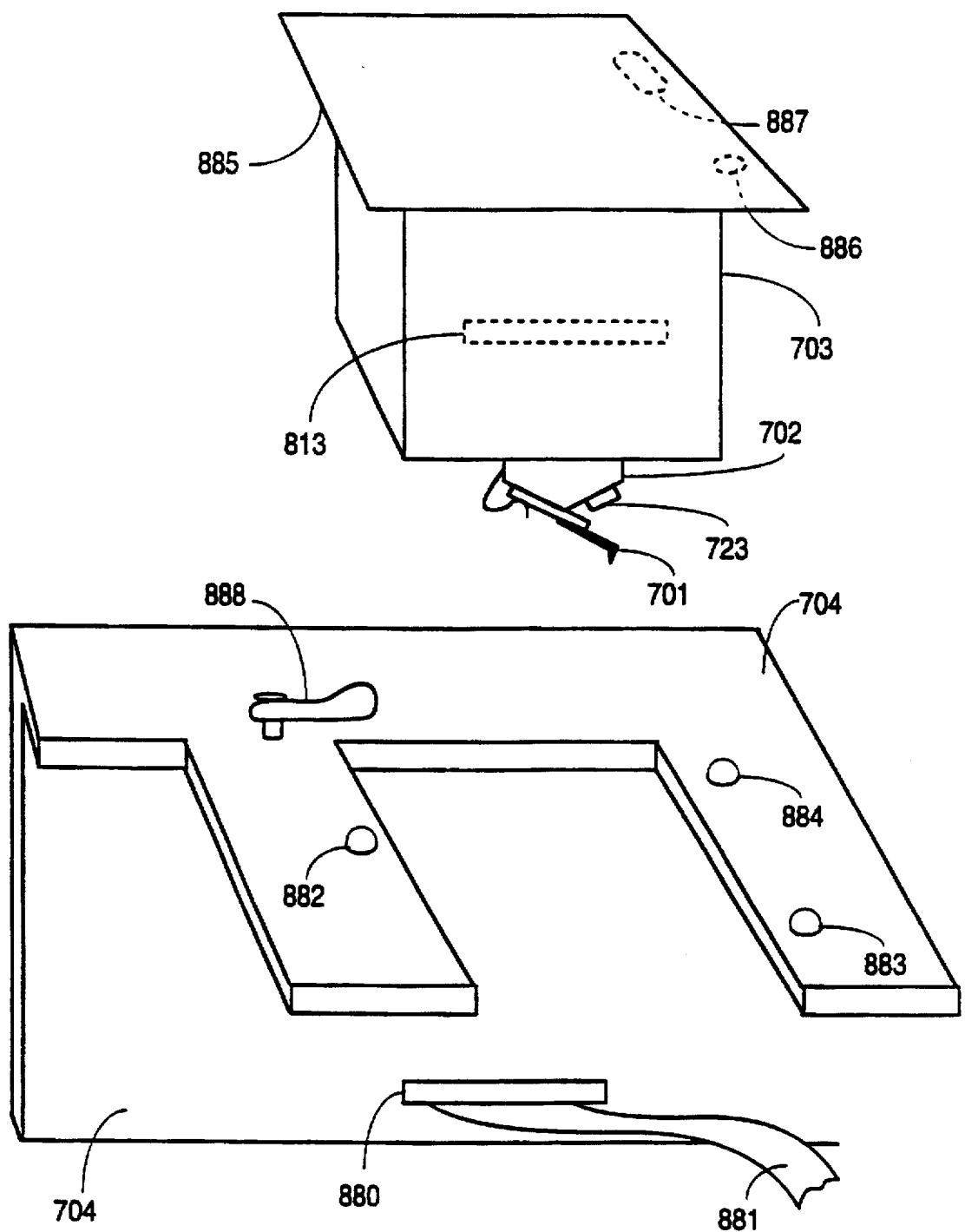
FIG. 8C illustrates the kinematic mounting of the scanner on the bracket.

FIG. 8C illustrates the mounting arrangement for scanner 703 on bracket 704. Bracket 704 has three ball bearings 882, 883,884 mounted on it. Scanner 703 has corresponding contact regions 885, 886 and 887 which engage the three ball bearings and kinematically locate scanner 703 on bracket 704. Contact region 885 is flat and engages ball bearing 882. Contact region 886 is conical and engages ball bearing 883 whilst contact region 887 is in the form of a slot and engages ball bearing 884. A clamp 888 serves to force the scanner 703 tightly onto the ball bearing mounts. An electrical connector 813 is mounted on the rear of scanner 703 and mates with a corresponding electrical connector 880 which is mounted loosely on bracket 704, such that whilst connectors 813 and 880 make reliable electrical contact they do not affect the positioning of scanner 703 on bracket 704, which is solely dictated by the kinematic mounting arrangement formed by the ball bearings and contact points described above.

FIG. 8A shows the internal structure of scanner 703, which is identical to that of application Ser. No. 07/850,669, with some notable exceptions. Scanner 703 consists of a body 815 in which is mounted a piezoelectric tube scanner 870. Mounting points 885, 886 and 887 are machined in body 815 at the fixed end of tube scanner 870. In application Ser. No. 07/850,669, the scanner was used to translate the sample in the microscope, which was mounted on the free end of the tube scanner, whilst the probe and optical deflection detection system were static relative to the scanner body. For a large sample system it is advantageous to scan the probe rather than the sample since the mass of the probe is generally smaller and is relatively constant. It is also advantageous to use a piezo-resistive probe since the mass of the deflection detection system is then much smaller and the need for precise optical alignment is eliminated. Therefore, in the present invention probe 701 is a piezo-electric probe with batch-fabricated integral tip and is used to sense the surface topography of sample 104. Probe 701 is kinematically mounted onto probe mount 702, which makes electrical contact with probe 701. Probe mount 702 is attached to the free end of tube scanner 870 which incorporates a fixture 830, similar to the similarly numbered fixture in application Ser. No. 07/850,669. Position sensing photodiodes 808, 814 and 816 are identical to the similarly numbered photodiodes described in application Ser. No. 07/850,669, as are the many systems and methods in which these photodiodes are interfaced and utilized to improve accuracy of imaging. FIG. 8B illustrates the mounting of fixture 830, which, for example, may be glued to the free end of tube 870 leaving exposed regions to which probe mount 702 may also be attached.

Figure 8D:
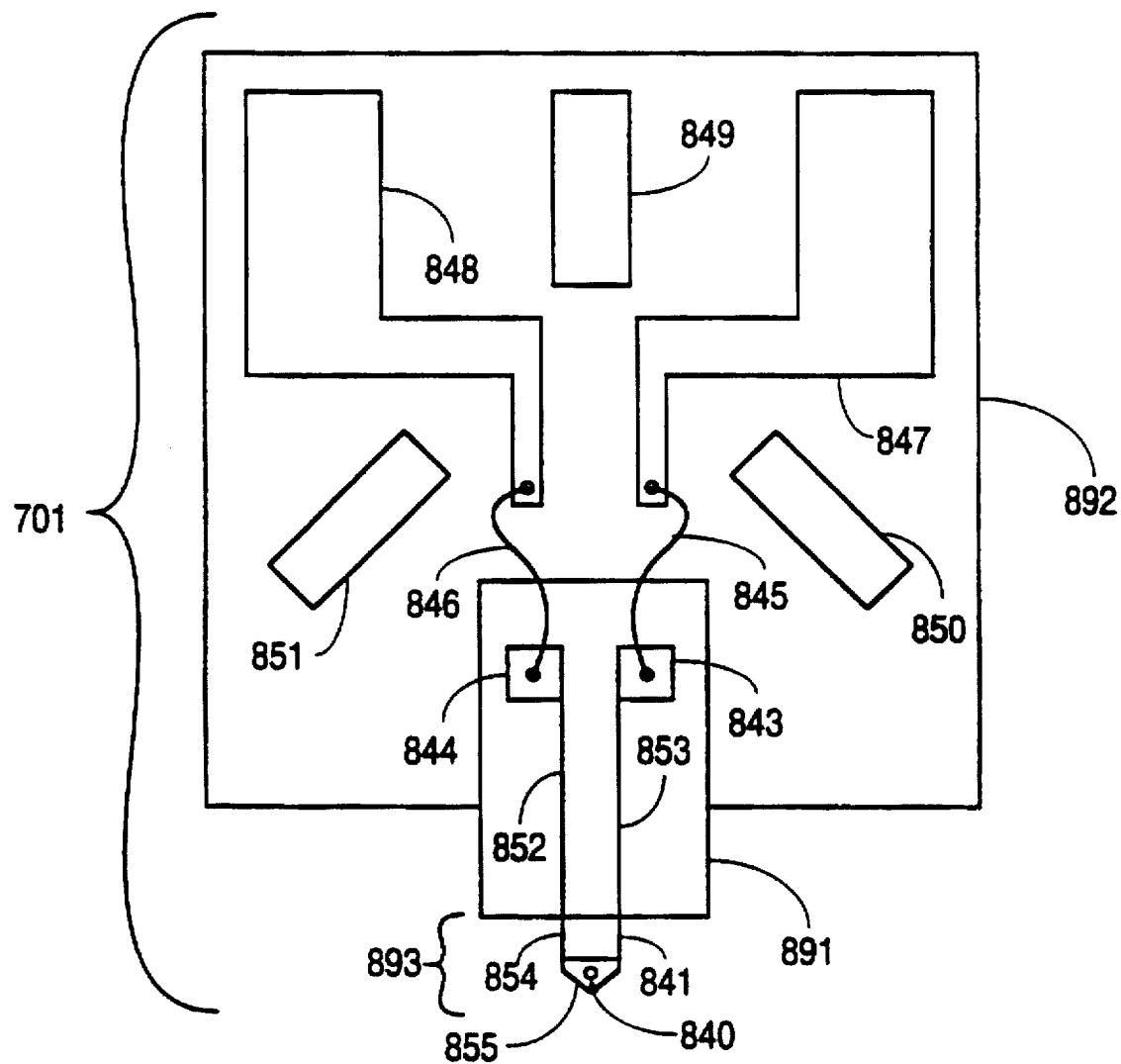
FIG. 8D illustrates a bottom view of the probe.

FIG. 8D illustrates probe 701. A piezo-cantilever chip 891 includes a piezo-resistive cantilever 893 and is glued to an alumina plate 892 using glue and standard IC mounting techniques or other alignment methods. Plate 892 includes three rectangular slots 849, 850 and 851 which are precisely laser machined in alumina plate 892 and are oriented at an angle of 120 degrees with respect to each other. Slots 849, 850 and 851 form kinematic mounting points which align probe 701 precisely in probe mount 702 with a precision of less than 1 micron, using principles outlined in application Ser. No. 07/850,669.

Piezo-resistive cantilever 893 and substrate chip 891 are microfabricated monolithically from a silicon wafer, using processes described in application Ser. No. 638,163. The piezo-resistive cantilever 893 includes two flexure arms 841 and 854 which are attached to cantilever end part 855, all of which are highly doped, using standard semiconductor fabrication methods, to make them electrically conductive. Also fabricated on the end part 855 is a high aspect-ratio tip 840 which is used to probe the surface of the sample 104. As tip 840 is scanned over the surface of sample 104 interatomic forces cause the tip to rise and fall with height variations of the surface of sample 104. Thus the deflection of cantilever 893 is a direct measure of the surface height of sample 104 in the region of the tip. The electrical resistance of flexure arms 841 and 854 is modified as the cantilever is deflected because of the piezo-resistive effect. Thus an electrical current may be passed from a metallic contact pad 848 on plate 892 through wire 846 onto a contact pad 844, along a conductive track 852, through flexure arm 854, across end part 855, along flexure arm 841, along a conductive track 853, through a contact pad 843, and finally through a wire 845 to contact pad 847, and the resistance to current flow is proportional to the cantilever deflection. This change in resistance may be converted into a voltage variation using a bridge amplifier circuit, as is well known in the art. Conductive tracks 852 and 853 may be fabricated by depositing and patterning a metal film using standard semiconductor techniques. Similarly, contact pads 848 and 847 may be silk screened onto alumina substrate 892. In accordance with this invention, other types of probes used in scanning probe microscopes, such as STM probes or conducting cantilevers or tips, may be substituted for piezo-resistive cantilever 893.

Figure 8E:
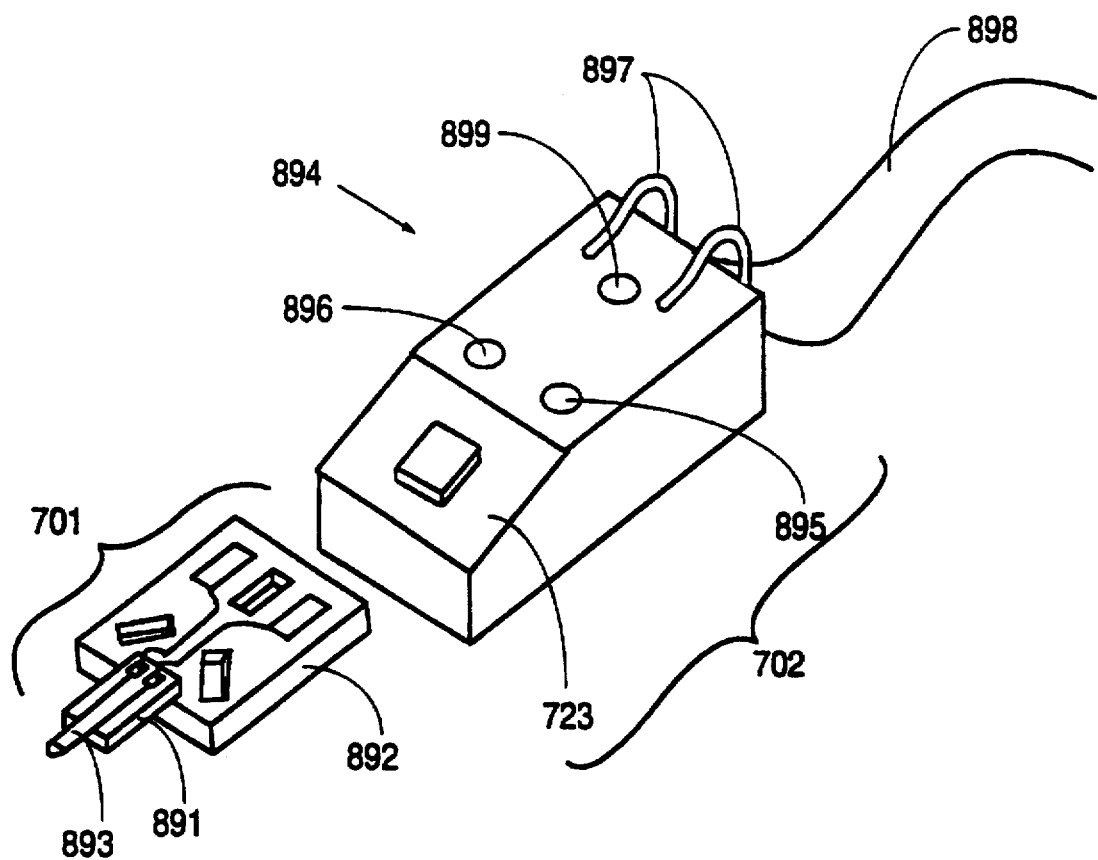
FIG. 8E illustrates a perspective view of the probe and probe mount.

FIG. 8E illustrates probe 701 and probe mount 702, including mirror 723. Probe mount 702 includes three ball bearings 895, 896 and 899 which are attached to its surface.

Ball bearings 895, 896 and 899 are arranged in the same pattern as slots 850, 851 and 849, and serve to kinematically locate probe 701 in probe mount 702, such that tip 840 can be reliably positioned relative to scanner body 815 within an error of 20 microns. Springs 897 serve to force probe 701 against the three ball mounts and also make electrical contact to contact pads 848 and 847. A flexible circuit board 898 connects springs 897 independently to the bridge amplifier circuit in order to complete the cantilever connection.

Amplification and processing of the signal from probe 701 are carried out by methods well known in the art and may advantageously be performed with the apparatus described in application Ser. No. 07/850,669.

There are alternative embodiments of this invention, including configurations in which the sample is static and the probe is mounted on the translation stage, and also configurations in which the sample is mounted on the probe.

Figure 10A:
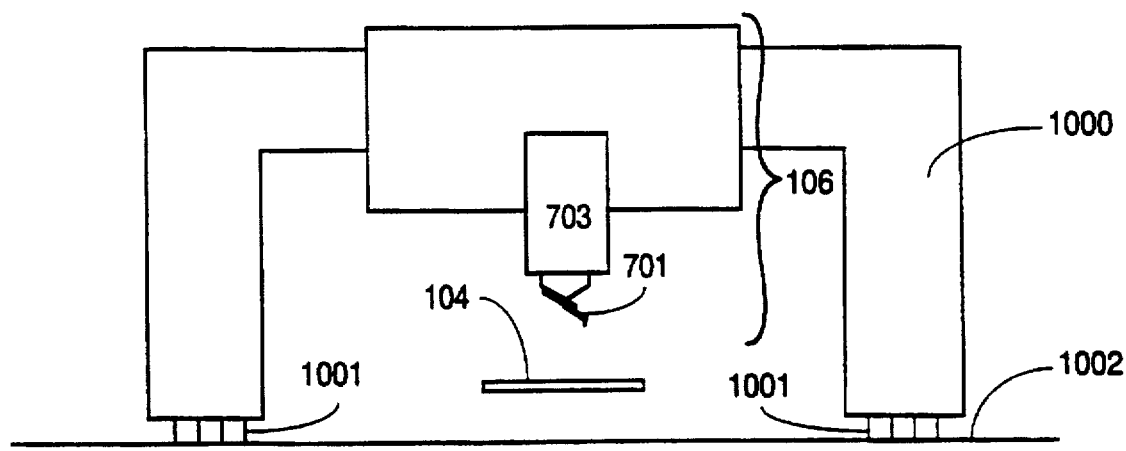
FIGS. 10A, 10B, and 10C illustrate side views of second, third and fourth embodiments of a translation stage according to the invention.

For example, in one alternative embodiment, illustrated in FIG. 10A, probe 701 is attached to a horizontal translation stage 1000 for coarse translation of the probe over a static sample 104. In such a configuration, stage 1000 may ride on air bearings 1001 over the surface of the sample or over a surface 1002 which supports the sample.

Figure 10B:
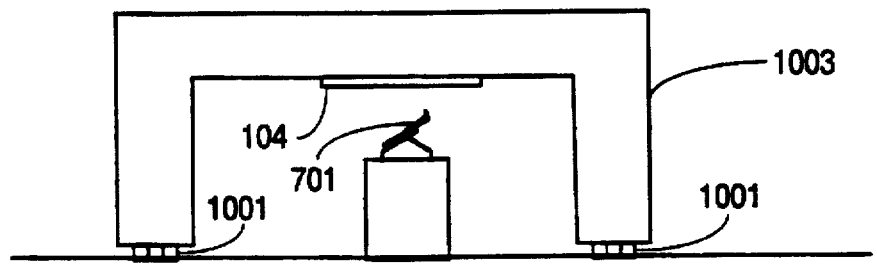

Another alternative embodiment is illustrated in FIG. 10B. In this configuration, sample 104 is mounted on the underside of a horizontal translation stage 1003 and faces a static probe 701. This configuration has an advantage over the configuration shown in FIG. 10A in that the mechanical path of the translation stage is smaller. For example, air bearings 1001 for the configuration shown in FIG. 10A must be spaced further apart than those of the configuration shown in FIG. 10B to provide for the full range of translation over the sample. The mechanical path of the configuration shown in FIG. 10B is therefore much smaller, providing increased positioning stability of probe 701 relative to the sample 104.

Figure 10C:
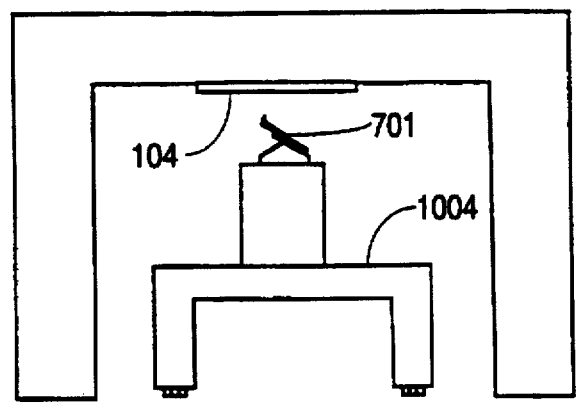

A further alternative embodiment is illustrated in FIG. 10C. In such a configuration, probe 701 is mounted on a horizontal translation stage 1004 and faces a static sample 104 which is mounted above it. This embodiment has the same advantage as that shown in FIG. 10B, that is, it has a smaller mechanical path than the embodiment shown in FIG. 10A.

The description of the above embodiments is intended to be illustrative and not limiting. Many alternative embodiments in accordance with the broad principles of this invention will be apparent to those skilled in the art.

We claim:

1. A scanning probe microscope comprising:
   a sample stage;
   a probe for analyzing a surface of a sample mounted on the sample stage; and
   a reflective surface positioned above the probe and oriented such that light from an illumination source is reflected by the reflective surface to the probe to illuminate an optical view of the probe.

2. The scanning probe microscope according to claim 1, wherein the reflective surface is positioned directly above the probe.

3. The scanning probe microscope according to claim 1, further including a probe mount, the probe and reflective surface being mounted on the probe mount.

4. The scanning probe microscope according to claim 1, wherein the reflective surface is planar.

5. The scanning probe microscope according to claim 1, wherein the reflective surface is curved.

6. The scanning probe microscope according to claim 1, further including a scanner for causing the probe to scan a sample mounted on the sample stage, the probe and reflective surface being mounted on the scanner.

7. A scanning probe microscope sensor head comprising:
   a probe for analyzing a surface of a sample mounted on a sample stage; and
   a reflective surface positioned above the probe and oriented such that light from an illumination source is reflected by the reflective surface to the probe to illuminate an optical view of the probe.

8. The scanning probe microscope sensor head according to claim 7, wherein the reflective surface is positioned directly above the probe.

9. The scanning probe microscope sensor head according to claim 7, further including a probe mount, the probe and reflective surface being mounted on the probe mount.

10. The scanning probe microscope sensor head according to claim 7, wherein the reflective surface is planar.

11. The scanning probe microscope sensor head according to claim 7, wherein the reflective surface is curved.

12. The scanning probe microscope sensor head according to claim 7, further including a scanner for causing the probe to scan a sample mounted on the sample stage, the probe and reflective surface being mounted on the scanner.

13. A scanning probe microscope comprising:
   a sample stage;
   a probe for analyzing a surface of a sample mounted on the sample stage; and
   a reflective surface positioned and oriented relative to the probe such that light which is directed to the probe and reflected by the probe to the reflective surface is reflected by the reflective surface back to the probe to provide illumination for an optical view of the probe.

14. The scanning probe microscope according to claim 13, wherein the optical view is an oblique optical view.

15. The scanning probe microscope according to claim 13, the reflective surface forming part of an optical system which further includes a light source for directing light to the probe along a first beam path, a portion of the light being reflected by the probe toward the reflective surface, and
   optics for providing the optical view of the probe along a second beam path.

16. The scanning probe microscope according to claim 15, wherein the second beam path is the same as the first beam path.

17. The scanning probe microscope according to claim 15, wherein the optical view is an oblique optical view.

18. The scanning probe microscope according to claim 13, wherein the reflective surface is planar.

19. The scanning probe microscope according to claim 13, wherein the reflective surface is curved.

20. A scanning probe microscope comprising:
   a sample stage;
   a probe for analyzing a surface of a sample mounted on the sample stage; and
   a reflective surface positioned above the probe and oriented such that light from an illumination source is reflected by the reflective surface to the probe to illuminate an optical view of the probe without also conveying the optical view of the probe.

21. The scanning probe microscope according to claim 20, wherein the reflective surface is positioned directly above the probe.

22. A scanning probe microscope sensor head comprising:
   a probe for analyzing a surface of a sample mounted on a sample stage; and
   a reflective surface positioned above the probe and oriented such that light from an illumination source is reflected by the reflective surface to the probe to illuminate an optical view of the probe without also conveying the optical view of the probe.

23. The scanning probe microscope according to claim 22, wherein the reflective surface is positioned directly above the probe.

* * * * *